(12) United States Patent
Spencer et al.

(10) Patent No.: US 8,685,879 B2
(45) Date of Patent: Apr. 1, 2014

(54) EMULSION PROCESS FOR IMPROVED LARGE SPHERICAL POLYPROPYLENE CATALYSTS

(75) Inventors: Michael Donald Spencer, Houston, TX (US); Neil O'Reilly, Houston, TX (US)

(73) Assignee: BASF Corporation, Florham Park, NJ (US)

( * ) Notice: Subject to any disclaimer, the term of this patent is extended or adjusted under 35 U.S.C. 154(b) by 200 days.

(21) Appl. No.: 13/097,210

(22) Filed: Apr. 29, 2011

(65) Prior Publication Data
US 2012/0277090 A1 Nov. 1, 2012

(51) Int. Cl.
*B01J 31/00* (2006.01)
*B01J 37/00* (2006.01)
*C08F 4/02* (2006.01)
*C08F 4/60* (2006.01)

(52) U.S. Cl.
USPC ............................ 502/107; 502/150; 502/162

(58) Field of Classification Search
USPC ......................................... 502/107, 150, 162
See application file for complete search history.

(56) References Cited

U.S. PATENT DOCUMENTS

| | | | |
|---|---|---|---|
| 4,485,035 A | | 11/1984 | Shiga et al. |
| 4,784,983 A | * | 11/1988 | Mao et al. ...................... 502/111 |
| 4,829,038 A | | 5/1989 | Hoppin et al. |
| 5,064,799 A | * | 11/1991 | Monte et al. .................. 502/115 |
| 5,227,439 A | * | 7/1993 | Luciani et al. .............. 526/124.6 |
| 5,244,854 A | * | 9/1993 | Noristi et al. ................. 502/120 |
| 5,798,314 A | * | 8/1998 | Spencer et al. ............... 502/115 |
| 6,291,385 B1 | | 9/2001 | Lee et al. |
| 6,323,293 B1 | | 11/2001 | Shamshoum et al. |
| 6,495,634 B2 | | 12/2002 | Huffer et al. |
| 6,521,725 B2 | | 2/2003 | Kumamoto et al. |
| 6,608,153 B2 | * | 8/2003 | Agapiou et al. ............... 526/154 |
| 6,984,600 B2 | | 1/2006 | Chosa et al. |
| 7,078,362 B2 | | 7/2006 | Nagy |
| 7,091,289 B2 | * | 8/2006 | Wang et al. ................. 526/125.6 |
| 7,238,758 B2 | | 7/2007 | Yoshikiyo et al. |
| 7,271,119 B2 | * | 9/2007 | Denifl et al. ................... 502/109 |
| 8,344,079 B2 | * | 1/2013 | Spencer ...................... 526/124.3 |
| 2005/0032991 A1 | | 2/2005 | Chosa et al. |
| 2005/0202958 A1 | | 9/2005 | Yoshikiyo et al. |
| 2006/0217502 A1 | | 9/2006 | Migone et al. |
| 2007/0155616 A1 | | 7/2007 | Wang et al. |
| 2009/0171044 A1 | * | 7/2009 | Spencer ...................... 526/125.3 |

FOREIGN PATENT DOCUMENTS

| | | |
|---|---|---|
| CN | 2002148336 | 4/2003 |
| EP | 0250229 | 5/1991 |
| JP | 06136041 | 5/1994 |
| JP | 06279520 | 10/1994 |
| JP | 2002003557 | 1/2002 |
| JP | 2007039529 | 2/2007 |
| WO | 9743321 | 11/1997 |
| WO | 2004016662 | 2/2004 |
| WO | 2006011334 | 2/2006 |
| WO | 2007018280 | 2/2007 |
| WO | 2007076639 | 7/2007 |

* cited by examiner

*Primary Examiner* — Patricia L Hailey
(74) *Attorney, Agent, or Firm* — Melanie L. Brown

(57) ABSTRACT

Disclosed are spherical magnesium-based catalyst supports and methods of using the same in a Ziegler-Natta catalyst system for the polymerization of an olefin. The spherical magnesium-based catalyst supports are made by reacting a magnesium halide, a haloalkylepoxide, and a phosphate acid ester in an organic solvent that does not have to contain substantial amounts of toluene.

23 Claims, 6 Drawing Sheets

| Example | A:TiCl4 addition | B:post TiCl4 hold | C:Viscoplex temp | D:post viscoplex hold | E:ramp time | D10 | D50 | D90 | span |
|---|---|---|---|---|---|---|---|---|---|
| | min | min | C | min | min | microns | microns | microns | |
| 3 | 30 | 60 | 25 | 0 | 80 | 9.9 | 18.5 | 29.5 | 1.06 |
| 4 | 30 | 0 | 5 | 0 | 80 | 8.9 | 20.2 | 48.5 | 1.96 |
| 5 | 30 | 0 | 25 | 60 | 20 | 9.5 | 19 | 35 | 1.34 |
| 6 | 90 | 0 | 25 | 0 | 20 | 27.8 | 48.1 | 75.1 | 0.98 |
| 7 | 90 | 60 | 5 | 0 | 20 | 25.7 | 57.1 | 110.5 | 1.49 |
| 8 | 90 | 0 | 5 | 60 | 80 | 8.5 | 40.2 | 60.6 | 1.30 |
| 9 | 60 | 30 | 15 | 30 | 50 | 15.4 | 30.1 | 48.1 | 1.09 |
| 10 | 60 | 30 | 15 | 30 | 50 | 14.8 | 30.3 | 50.8 | 1.19 |
| 11 | 30 | 60 | 5 | 60 | 20 | 7.4 | 16.2 | 28.7 | 1.31 |
| 12 | 90 | 0 | 25 | 0 | 20 | 12.2 | 51.4 | 89.9 | 1.51 |
| 13 | 90 | 60 | 25 | 60 | 80 | 21.9 | 35.1 | 49.1 | 0.78 |
| 14 | 30 | 0 | 5 | 0 | 80 | 8.9 | 20.2 | 48.5 | 1.96 |
| 15 | 60 | 30 | 15 | 30 | 50 | 17.5 | 35.1 | 58.7 | 1.18 |
| 16 | 60 | 30 | 15 | 30 | 50 | 18.5 | 36.4 | 64.6 | 1.27 |
| 17 | 30 | 60 | 25 | 0 | 80 | 2.8 | 18.6 | 29.1 | 1.41 |
| 18 | 30 | 0 | 25 | 60 | 20 | 10 | 19.3 | 33.5 | 1.22 |
| 19 | 90 | 60 | 5 | 0 | 20 | 102 | 276 | 719 | 2.23 |
| 20 | 30 | 60 | 5 | 60 | 20 | 16 | 44.3 | 84.4 | 1.54 |
| 21 | 90 | 0 | 5 | 60 | 80 | 14.6 | 54.6 | 95.3 | 1.48 |
| 22 | 90 | 60 | 25 | 60 | 80 | 30.1 | 43 | 59.2 | 0.68 |
| 23 | 30 | 0 | 5 | 0 | 20 | 13.7 | 26.1 | 43.9 | 1.15 |
| 24 | 30 | 60 | 25 | 0 | 20 | 24.1 | 37.3 | 54.2 | 0.81 |
| 25 | 90 | 0 | 5 | 60 | 20 | 28.3 | 47.1 | 85.2 | 1.21 |
| 26 | 90 | 60 | 25 | 60 | 20 | 13.9 | 30.8 | 48.6 | 1.12 |
| 27 | 90 | 60 | 5 | 0 | 80 | 22.3 | 46.5 | 84.5 | 1.34 |
| 28 | 30 | 60 | 5 | 60 | 80 | 14.6 | 29 | 53.5 | 1.34 |
| 29 | 60 | 30 | 15 | 30 | 50 | 34.6 | 52.1 | 85.2 | 0.97 |
| 30 | 90 | 0 | 25 | 0 | 80 | 45 | 103 | 297 | 2.44 |
| 31 | 30 | 0 | 25 | 60 | 80 | 3.4 | 20.8 | 31.9 | 1.37 |
| 32 | 60 | 30 | 15 | 30 | 50 | 25.7 | 42.8 | 63.8 | 0.89 |
| 33 | 60 | 30 | 15 | 30 | 50 | 8.2 | 43 | 62 | 1.48 |
| 34 | 30 | 0 | 5 | 0 | 20 | 5.9 | 21.6 | 39.8 | 1.57 |

Figure 6

EMULSION PROCESS FOR IMPROVED LARGE SPHERICAL POLYPROPYLENE CATALYSTS

TECHNICAL FIELD

Olefin polymerization catalyst systems and methods of making the catalyst systems and olefin polymers and copolymers using the catalyst systems are described.

BACKGROUND

Polyolefins are a class of polymers derived from simple olefins. Known methods of making polyolefins involve the use of Ziegler-Natta polymerization catalysts. These catalysts polymerize vinyl monomers using a transition metal halide to provide an istotactic polymer.

Numerous Ziegler-Natta polymerization catalysts exist. The catalysts have different characteristics and/or lead to the production of polyolefins having diverse properties. For example, certain catalysts have high activity while other catalysts have low activity. Moreover, polyolefins made with the use of Ziegler-Natta polymerization catalysts vary in isotacticity, molecular weight distribution, impact strength, melt-flowability, rigidity, heat sealability, isotacticity, and the like. As olefin monomers are enchained in the presence of a Ziegler-Natta catalyst system, the product polymer takes on the shape and morphology of the solid components of the Ziegler-Natta catalyst system. Polymer product having a controlled and regular morphology can be more easily transported within and between reactors employed for polymer synthesis.

Ziegler-Natta catalysts having desirable spherical shape can be produced through a precipitation method employing an organic magnesium starting material. Replacement of organic magnesium with an inexpensive magnesium halide results in catalysts particles with divergent morphology and aspherical.

SUMMARY

The following presents a simplified summary in order to provide a basic understanding of some aspects of the catalyst systems described herein. This summary is not an extensive overview. It is intended to neither identify key or critical elements nor delineate the scope of the invention. Rather, the sole purpose of this summary is to present some concepts of the catalyst systems in a simplified form as a prelude to the more detailed description that is presented hereinafter.

This disclosure provides for polymerization catalyst systems, wherein such systems are formed from a solid titanium catalyst component incorporating a magnesium-based support having substantially spherical shape using magnesium halide starting materials. The spherical magnesium-based catalyst supports are made by reacting a magnesium halide, an alkylepoxide, and a phosphate acid ester in an organic solvent One aspect relates to a catalyst system for the polymerization of an olefin. The catalyst system incorporates a solid titanium catalyst component having a substantially spherical shape and a diameter from about 5 to about 150 μm (on a 50% by volume basis), the solid titanium catalyst component contains a titanium compound, an internal electron donor, and a magnesium-based support made from a mixture containing a magnesium compound, an alkylepoxide, a phosphate acid ester, a titanium halide and a polymer surfactant. An organoaluminum compound having at least one aluminum-carbon bond is combined with the solid titanium catalyst support prior to polymerization to complete the catalyst system.

Another aspect relates to a method for making a magnesium-based catalyst support. A magnesium halide, an alkylepoxide, a phosphate acid ester, and an organic solvent are combined to form a mixture. A titanium halide is added to the mixture at a first temperature. The organic solvent is selected such that the mixture separates into at least two phases, a dense phase containing magnesium components and a light phase containing the organic solvent, upon addition of the titanium halide. An alkyl methacrylate-based additive is added to the phase-separated mixture at a second temperature higher than the first temperature. Upon heating of the phase-separated mixture to a third temperature, the magnesium-based catalyst support solidifies from the mixtures. The magnesium-based catalyst support has a substantially spherical shape and a specific diameter.

Additional aspects relate to methods and systems for synthesizing polyolefins using the described catalyst systems. A Ziegler-Natta catalyst system, as described herein, is contacted with an olefin, optional olefin comonomers, hydrogen gas, a fluid media, and other optional additives in a suitable reactor. Optionally, a multizone circulating reactor can be used that allows for different gas-phase polymerization conditions exist on either side of a liquid barrier. The spherical nature of the solid component(s) of the Ziegler-Natta catalyst system assists in movement of the catalyst and polymer particles within the reactor and facilitates removal of the polymer upon completion of polymerization.

To the accomplishment of the foregoing and related ends, the features hereinafter fully described and particularly pointed out in the claims. The following description and the annexed drawings set forth in detail certain illustrative aspects and implementations of the described catalyst systems. These are indicative, however, of but a few of the various ways in which the principles of the catalyst systems may be employed. Other objects, advantages and novel features will become apparent from the following detailed description of the disclosed catalyst systems when considered in conjunction with the drawings.

BRIEF SUMMARY OF THE DRAWINGS

FIG. 6 reports Variables A to E for Examples 3-34.

DETAILED DESCRIPTION

Figure 1:
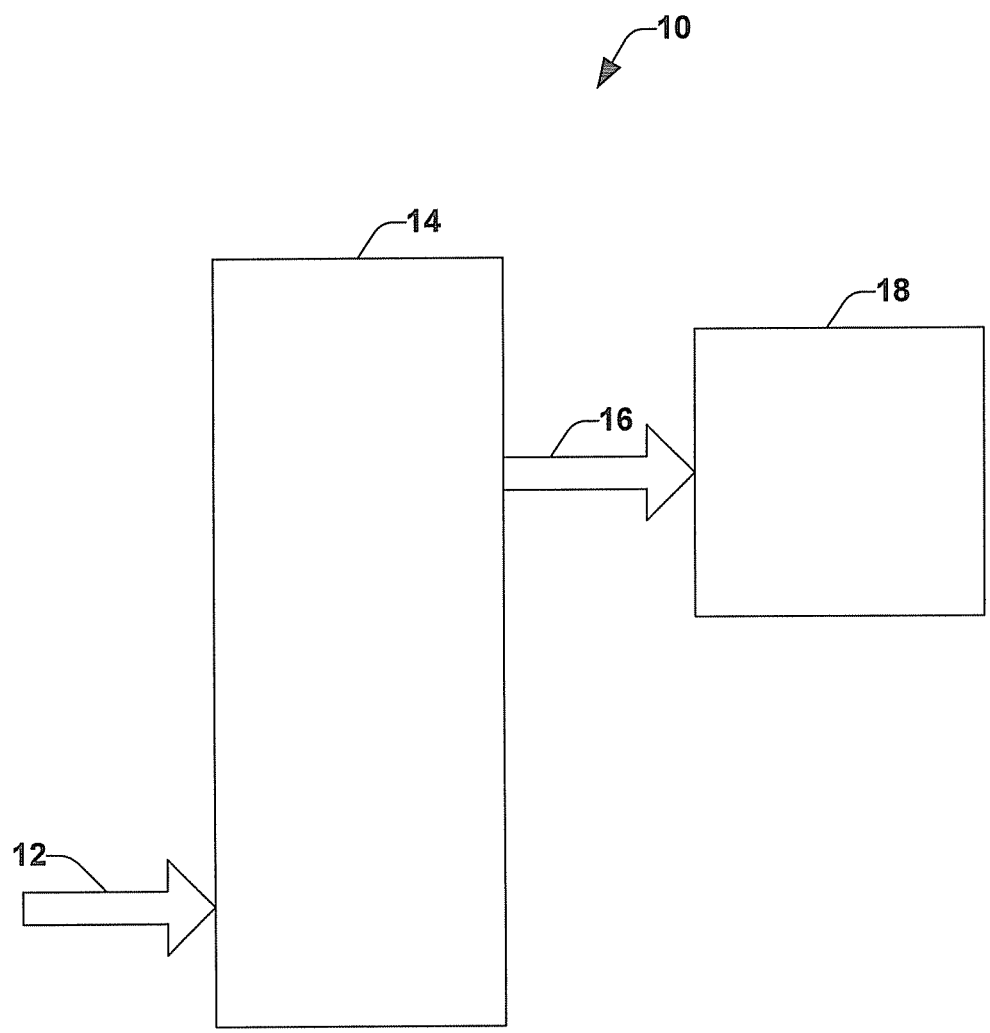
FIG. 1 is a high level schematic diagram of an olefin polymerization system in accordance with one aspect of the described polymerization systems.

Described herein are Ziegler-Natta catalyst systems and supports for Ziegler-Natta catalysts and methods of making the same. One aspect of the catalyst systems is a magnesium-based support for polymerizing an olefin, where the magnesium-based support has substantially spherical shape. The magnesium-based support can be used to form a competent Ziegler-Natta catalyst in combination with a titanium compound, one or more external and/or internal electron donors and an organo-aluminum compound. The magnesium-based support is comprised within the solid titanium catalyst component. Emulsion techniques can be employed to make the solid titanium catalyst component and magnesium-based support.

As used throughout this disclosure, the term "magnesium-based support" refers to a support formed by precipitation or solidification of a catalyst support from a mixture containing a non-reducible magnesium compound. A magnesium-based support may or may not contain titanium or another group IV metal or metal ion. The term "solid titanium catalyst component" refers to a procatalyst containing a magnesium-based support, titanium or another group IV metal or metal ion, and optionally one or more internal electron donors that are useful for forming a competent Ziegler-Natta catalyst system upon combination with a main group metal alkyl. In some embodiments, the solid titanium catalyst component is formed directly by precipitation or solidification from a mixture containing a non-reducible magnesium compound and titanium or another group IV metal or metal ion. In other embodiment, the solid titanium catalyst component is formed by further reacting a magnesium-based support with a titanium compound and optionally one or more internal electron donors.

In a typical manner of employing the Ziegler-Natta catalyst system, a solid titanium catalyst component, an electron donor, and an organo-aluminum compound (a main group metal alkyl) form a slurry catalyst system, which can contain any suitable liquid such as an inert hydrocarbon medium. Examples of inert hydrocarbon media include aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride and chlorobenzene; and mixtures thereof. The slurry medium is typically hexane, heptane or mineral oil. The slurry medium can be different from the diluent used in forming the mixture from which the solid titanium catalyst component is precipitated.

The herein described magnesium-based catalyst supports can be utilized in any suitable Ziegler-Natta polymerization catalyst system. Ziegler-Natta catalyst systems are comprised of a reagent or combination of reagents that are functional to catalyze the polymerization of 1-alkenes ($\alpha$-olefins) to form polymers, typically with high isotacticity, when pro-chiral 1-alkenes are polymerized. A Ziegler-Natta catalyst system has a transition metal alkyl component (such as a solid titanium component), a main group metal alkyl component, and an electron donor; as used throughout this disclosure, the term "Ziegler-Natta catalyst" refers to any composition having a transition metal and a main group metal alkyl component capable of supporting catalysis of 1-alkene polymerization. The transition metal component is typically a Group IV metal such as titanium, or vanadium, the main group metal alkyl is typically an organoaluminum compound having a carbon-Al bond, and the electron donor can be any of numerous compounds including aromatic esters, alkoxysilanes, amines and ketones can be used as external donors added to the transition metal component and the main group metal alkyl component or an appropriate internal donor added to the transition metal component and the main group metal alkyl component during synthesis of those components. The details of the constituent, structure, and manufacture of the one or more electron donors and organoaluminum compound components are not critical to the practice of the described catalyst systems, provided that the Ziegler-Natta polymerization catalyst system has a solid titanium component incorporating the magnesium-based support as described herein. The details of the constituent, structure, and manufacture of the Ziegler-Natta polymerization catalyst system can be found in, for example, U.S. Patents and U.S. Patent Publications: U.S. Pat. Nos. 4,771,023; 4,784,983; 4,829,038; 4,861,847; 4,990,479; 5,177,043; 5,194,531; 5,244,989; 5,438,110; 5,489,634; 5,576,259; 5,767,215; 5,773,537; 5,905,050; 6,323,152; 6,437,061; 6,469,112; 6,962,889; 7,135,531; 7,153,803; 7,271,119; 2004/242406; 2004/0242407; and 2007/0021573, all of which are hereby incorporated by reference in this regard.

The magnesium-based support and solid titanium catalyst component are prepared using emulsion techniques. Initially, the magnesium-based support is prepared by contacting a non-reducible magnesium compound, an alkylepoxide, and a Lewis base such as trialkyl phosphate acid ester together in a diluent organic solvent at a first temperature to form one or more monohaloalkoxide magnesium compounds and/or dihaloalkoxide magnesium compounds. For sake of brevity, these compounds are simply referred to as haloalkoxide magnesium compounds. Combining these components creates an emulsion with two phases: the solvent phase and the magnesium phase.

Phase separation is accomplished by proper solvent selection. Solvent selection involves considering one or more of physical properties differences in polarity, density, and surface tension among others causing the separation between the diluent organic solvent and the magnesium phase. Toluene is a common organic solvent diluent that has been used for the formation of solid titanium catalyst components; however, use of toluene does not always promote the formation of two phases. In relation to the magnesium-based supports disclosed herein, it was serendipitously discovered that the use of hexane as a diluent organic solvent can in some instances result in the formation of a solvent phase and a magnesium phase. The two phases are maintained upon subsequent addition of the titanium compound.

In one embodiment, the mixture/emulsion does not include a substantial amount toluene, although toluene can be mixed with other solvents. In another embodiment, the phase-separated mixture/emulsion does not contain more than about 25% by weight of toluene prior to solidification of the magnesium-based catalyst support. It is believed that organic solvents other than hexane can also be useful in bringing about the desired phase separation. In particular, non-aromatic alkane-based solvents are useful such as pentane, hexane, heptane, octane, and cyclohexane.

The emulsion formed haloalkoxide magnesium compound(s) can then contacted with a titanium halide compound to form the solid titanium catalyst component (which is then subsequently isolated from the emulsion). The emulsion can be raised to a second temperature greater than the first temperature and a surfactant can be added to control phase morphology. Then, the emulsion can be raised to a third temperature greater than the second temperature to solidify the solid titanium catalyst component.

Formation of the emulsion is facilitated using conventional emulsion techniques including one or more of agitation, stirring, mixing, high and/or low shear mixing, mixing nozzles, atomizers, membrane emulsification techniques, milling, sonication, vibration, microfluidization, and the like. Although the term emulsion is generally employed herein, it is understood that the emulsion shall encompass dispersions, colloids, emulsions, and other two-phase systems.

In one embodiment, the non-reducible magnesium compound is a halogen-containing magnesium compound. Specific examples of magnesium compounds having no reducibility include magnesium halides such as magnesium chloride, magnesium bromide, magnesium iodide, and magnesium fluoride.

The alkylepoxide compound is a glycidyl-containing compound having the structure of Formula I:

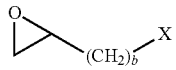

(I)

where b is from 1 to about 5 and X is selected from F, Cl, Br, I, and methyl. In one embodiment, the alkylepoxide compound is epichlorohydrin. The alkylepoxide compound can be a haloalkylepoxide compound or a nonhaloalkylepoxide compound.

A Lewis base is any species that donates lone pair electrons. Examples of Lewis bases include phosphate acid esters such as a trialkyl phosphate acid ester. A trialkyl phosphate acid ester can be a compound with the structure of Formula II:

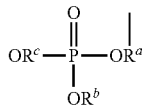

(II)

where $R^a$, $R^b$, and $R^c$ are, independently, selected from one or more of methyl, ethyl, propyl, isopropyl, butyl, isobutyl, tert-butyl, alkyl groups having from 1 to about 10 carbon atoms, and branched alkyl groups having from about 3 to about 10 carbon atoms. In one embodiment, the trialkyl phosphate acid ester is tributyl phosphate acid ester.

The non-reducible magnesium compound, alkylepoxide, and the Lewis base are contacted in the presence of an organic solvent at a first temperature from about 25 to about 100° C. to form a mixture/emulsion. In another embodiment, the first temperature is from about 40 to about 70° C. The molar ratio of the magnesium compound to alkylepoxide is from about 0.1:2 to about 2:0.1. The molar ratio of the magnesium compound to the Lewis base is from about 0.7:1.3 to about 1.3:0.7. Without wishing to be bound by any one theory, it is believed that a halogen atom is transferred from the magnesium compound to the alkylepoxide to open the epoxide ring and form an alkoxide magnesium species having a bond between the magnesium atom and the oxygen atom of the newly formed alkoxide group. The Lewis base functions to increase solubility of the magnesium-containing species present.

After contact of the non-reducible magnesium compound, alkyl epoxide, and the Lewis base, a titanium halide is added while maintaining the mixture/emulsion at the first temperature or at a different temperature. The molar ratio of the amount of titanium halide added to the magnesium compound is from about 3:1 to about 15:1. Upon addition of the titanium compound, the titanium compound enters the magnesium phase where the titanium compound reacts with the haloalkoxide magnesium compound.

The magnesium phase including the magnesium-containing species is dispersed within the solvent phase. The size and shape of droplets forming the magnesium phase can be controlled through a combination of adjusting the temperature, adjusting the agitation energy, adjusting the time of reaction and/or time of agitation energy, and including/excluding various additives, such as surfactants. After phase separation and/or titanium compound addition, the mixture is raised to a second temperature higher than the first temperature. In one embodiment, the second temperature is from about 15 to about 30° C. In another embodiment, the second temperature is form about 20 to about 35° C. While the mixture is at the second temperature, a polymer surfactant is added to facilitate formation of spherical droplets of the magnesium phase surrounded by the solvent phase. That is, the addition of a polymer surfactant can assist in controlling the morphology of the droplets of the magnesium phase. The polymer surfactant is blended into the mixture over time. In one embodiment, the polymer surfactant is added and then the mixture is blended for a period from about 30 to about 60 minutes. In another embodiment, the polymer surfactant is added and then the mixture is blended for a period from about 15 to about 90 minutes.

General examples of surfactants include polymer surfactants, such as polyacrylates, polymethacrylates, polyalkyl methacrylates, or any other surfactant that can stabilize and emulsion. Surfactants are known in the art, and many surfactants are described in McCutcheon's "Volume I: Emulsifiers and Detergents", 2001, North American Edition, published by Manufacturing Confectioner Publishing Co., Glen Rock, N.J., and in particular, pp. 1-233 which describes a number of surfactants and is hereby incorporated by reference for the disclosure in this regard. A polyalkyl methacrylate is a polymer that may contain one or more methacrylate monomers, such as at least two different methacrylate monomers, at least three different methacrylate monomers, etc. Moreover, the acrylate and methacrylate polymers may contain monomers other than acrylate and methacrylate monomers, so long as the polymer surfactant contains at least about 40% by weight acrylate and methacrylate monomers.

Examples of monomers that be polymerized using known polymerization techniques into polymer surfactants include one or more of acrylate; tert-butyl acrylate; n-hexyl acrylate; methacrylate; methyl methacrylate; ethyl methacrylate; propyl methacrylate; isopropyl methacrylate; n-butyl methacrylate; t-butyl methacrylate; isobutyl methacrylate; pentyl methacrylate; isoamyl methacrylate; n-hexyl methacrylate; isodecyl methacrylate; lauryl methacrylate; stearyl methacrylate; isooctyl acrylate; lauryl acrylate; stearyl acrylate; cyclohexyl acrylate; cyclohexyl methacrylate; methoxy ethyl acrylate; isobenzyl acrylate; isodecyl acrylate; n-dodecyl acrylate; benzyl acrylate; isobornyl acrylate; isobornyl methacrylate; 2-hydroxyethyl acrylate; 2-hydroxypropyl acrylate; 2-methoxyethyl acrylate; 2-methoxybutyl acrylate; 2-(2-ethoxyethoxy)ethyl acrylate; 2-phenoxyethyl acrylate; tetrahydrofurfuryl acrylate; 2-(2-phenoxyethoxy)ethyl acrylate; methoxylated tripropylene glycol monoacrylate; 1,6-hexanediol diacrylate; ethylene glycol dimethacrylate; diethylene glycol dimethacrylate; triethylene glycol dimethacrylate; polyethylene glycol dimethacrylate; butylene glycol dimethacrylate; trimethylolpropane 3-ethoxylate triacrylate; 1,4-butanediol diacrylate; 1,9-nonanediol diacryiate; neopentyl glycol diacrylate; tripropylene glycol diacrylate; tetraethylene glycol diacrylate; heptapropylene glycol diacrylate; trimethylol propane triacrylate; ethoxylated trimethylol propane triacrylate; pentaerythritol triacrylate; trimethylolpropane trimethacrylate; tripropylene glycol diacrylate; pentaerythritol tetraacrylate; glyceryl propoxy triacrylate; tris(acryloyloxyethyl)phosphate; 1-acryloxy-3-methacryloxy glycerol; 2-methacryloxy-N-ethyl morpholine; and allyl methacrylate, and the like.

Examples of polymer surfactants that are commercially available include those under the trade designation VISCOPLEX® available from RohMax Additives, GmbH, especially those having product designations 1-254, 1-256 and those under the trade designations CARBOPOL® and PEMULEN® available from Noveon/Lubrizol.

The polymer surfactant is typically added in a mixture with an organic solvent. When added as a mixture with an organic solvent, the volume ratio of surfactant to organic solvent is from about 1:10 to about 2:1. In another embodiment, the volume ratio of surfactant to organic solvent is from about 1:6 to about 1:1. In yet another embodiment, the volume ratio of surfactant to organic solvent is from about 1:4 to about 1:2.

The morphology of the droplets of the magnesium phase can be controlled through a combination of temperature, agitation energy, and type and amount of polymer surfactant. The magnesium-base support and/or solid titanium catalyst component is solidified from the mixture by changing/raising the mixture to a third temperature higher than the second temperature. In one embodiment, the third temperature is from about 35 to about 50° C. In another embodiment, the third temperature is from about 40 to about 45° C. The magnesium-based catalyst support and/or solid titanium catalyst component is recovered from the mixture by any suitable means, such as filtration. In one embodiment, the magnesium-based catalyst support and/or solid titanium catalyst component is not recovered using spray drying.

The magnesium-based supports and/or solid titanium catalyst components formed using the methods described herein are substantially spherical in shape. Substantially spherically shaped catalyst supports are particles which satisfy the following condition:

$$f=\sqrt{[A/(\pi/4)]}/D_{max}$$

in which f is greater than about 0.7, A is the cross-sectional area in mm², and $D_{max}$ is the maximum diameter of the cross-sectional area in mm. The factor f is a measure of the degree of sphericalness of the magnesium-based catalyst support particles. The closer f is to 1, the closer the shape of the particles is to an ideal spherical shape. In another embodiment, the substantially spherically shaped catalyst supports have an f value is greater than about 0.8. In yet another embodiment, the substantially spherically shaped catalyst supports have an f value is greater than about 0.9.

The magnesium-based supports and/or solid titanium catalyst components formed using the methods described herein are also uniformly substantially spherical in shape. In this connection, in one embodiment, 90% by weight of the magnesium-based supports and/or solid titanium catalyst components have an f value is greater than about 0.8. In another embodiment, 90% by weight of the magnesium-based supports and/or solid titanium catalyst components have an f value is greater than about 0.9.

When the catalyst support is made using substantially equal molar amounts of a magnesium compound and an epoxy compound, a catalyst system is provided that produces polymer product having a narrow particle size distribution is obtained. In one embodiment, the particle size span is from about 0.25 to about 1.75. In another embodiment, the particle size span is from about 0.5 to about 1.5. In yet another embodiment, the particle size span is from about 0.7 to about 1.1. The unitless value of particle size span is determined by subtracting the D10 size from the D90 size, then dividing by the D50 size. D10 is the diameter wherein 10% of the particles are smaller, D90 is the diameter wherein 90% of the particles are small, and D50 is the diameter wherein 50% of the particles are small and 50% of particles are larger.

If the solid titanium catalyst component is not formed using the emulsion process described above (where only the magnesium-based support is made using the emulsion process), the solid titanium catalyst component can be prepared by contacting the magnesium-based catalyst support, as described above, and a titanium compound. The titanium compound used in the preparation of the solid titanium catalyst component is, for example, a tetravalent titanium compound represented by Formula III:

$$Ti(OR)_g X_{4-g} \quad\quad (III)$$

wherein each R group independently represents a hydrocarbon group, preferably an alkyl group having 1 to about 4 carbon atoms, X represents a halogen atom, and $0 \leq g \leq 4$. Specific examples of the titanium compound include titanium tetrahalides such as $TiCl_4$, $TiBr_4$ and $TiI_4$; alkoxytitanium trihalides such as $Ti(OCH_3)Cl_3$, $Ti(OC_2H_5)Cl_3$, $Ti(O\text{ n-}C_4H_9)Cl_3$, $Ti(OC_2H_5)Br_3$ and $Ti(O\text{ iso-}C_4H_9)Br_3$; dialkoxytitanium dihalides such as $Ti(OCH_3)_2Cl_2$, $Ti(OC_2H_5)_2Cl_2$, $Ti(O\text{ n-}C_4H_9)_2Cl_2$ and $Ti(OC_2H_5)_2Br_2$; trialkoxytitanium monohalides such as $Ti(OCH_3)_3Cl$, $Ti(OC_2H_5)_3Cl$, $Ti(O\text{ n-}C_4H_9)_3Cl$ and $Ti(OC_2H_5)_3Br$; and tetraalkoxytitaniums such as $Ti(OCH_3)_4$, $Ti(OC_2H_5)_4$, $Ti(OC_3H_7)_3Cl$, $Ti(OC_3H_7)_2Cl_2$, $Ti(OC_3H_7)Cl_3$ and $Ti(O\text{ n-}C_4H_9)_4$.

In one embodiment, the titanium compound is a titanium tetrahalide. These titanium compounds may be used individually or in a combination of two or more. They also can be used as dilutions in hydrocarbon compounds or halogenated hydrocarbons.

When preparing the solid titanium catalyst component, an optional internal electron donor can be included, or the solid titanium catalyst component can be treated to contain an optional internal electron donor. Internal electron donors can be Lewis acids. A Lewis acid is a chemical species that is an electron-pair acceptor.

Internal electron donors, for example, oxygen-containing electron donors such organic acid esters, polycarboxylic acid esters, polyhydroxy ester, heterocyclic polycarboxylic acid esters, inorganic acid esters, alicyclic polycarboxylic acid esters and hydroxy-substituted carboxylic acid esters compounds having 2 to about 30 carbon atoms such as methyl formate, ethyl acetate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, dibutyl maleate, diethyl butylmalonate, diethyl dibutylmalonate, ethyl cyclohexanecarboxylate, diethyl 1,2-cyclohexanedicarboxylate, di-2-ethylhexyl 1,2-cyclohexanedicarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, dimethyl phthalate, diethyl phthalate, dipropyl phthalate, diisopropyl phthalate, dibutyl phthalate, diisobutyl phthalate, dioctyl phthalate, γ-butyrolactone, δ-valerolactone, coumarine, phthalide, ethylene carbonate, ethyl silicate, butyl silicate, vinyltriethoxysilane, phenyltriethoxysilane and diphenyldiethoxysilane; alicyclic polycarboxylic acid esters such as diethyl 1,2-cyclohexanecarboxylate, diisobutyl 1,2-cyclohexanecarboxylate, diethyl tetrahydrophthalate and nadic acid, diethyl ester; aromatic polycarboxylic acid esters such as monoethyl phthalate, dimethyl phthalate, methylethyl phthalate, monoisobutyl phthalate, mono-n-butyl phthalate, diethyl phthalate, ethyl isobutyl phthalate, ethyl-n-butyl phthalate, di-n-propyl phthalate, diisopropyl phthalate, di-n-butyl phthalate, diisobutyl phthalate, di-n-heptyl phthlate, di-2-ethylhexyl phthalate, di-n-octyl phthalate, dineopentyl phthalate, didecyl phthalate, benzylbutyl phthalate, diphenyl phthalate, diethyl naphthalenedicarboxylate, dibutyl naphthlenedicarboxylate, triethyl trimelliatate and dibutyl trimellitate, 3,4-furanedicarboxylic acid esters, 1,2-diacetoxybenzene, 1-methyl-2,3-diacetoxybenzene, 2-methyl-2,3-diacetoxybenzene, 2,8-diacetoxynaphthalene, ethylene glycol dipivalate, butanediol pivalate, benzoylethyl salicylate, acetylisobutyl salicylate and acetylmethyl salicylate.

Long-chain dicarboxylic acid esters, such as diethyl adipate, diisobutyl adipate, diisopropyl sebacate, di-n-butyl sebacate, di-n-octyl sebacate and di-2-ethylhexyl sebacate, may also be used as the polycarboxylic acid esters that can be included in the titanium catalyst component. Among these polyfunctional esters, compounds having the skeletons given by the above general formulae are preferred. Also preferred are esters formed between phthalic acid, maleic acid or substituted malonic acid and alcohols having at least about 2 carbon atoms, diesters formed between phthalic acid and alcohols having at least about 2 carbon atoms are especially preferred. Monocarboxylic acid esters represented by RCOOR' where R and R' are hydrocarbonyl groups that can have a substituent, and at least one of them is a branched or ring-containing aliphatic group alicyclic. Specifically, at least one of R and R' may be $(CH_3)_2CH-$, $C_2H_5CH(CH_3)-$, $(CH_3)_2CHCH_2-$, $(CH_3)_3C-$, $C_2H_5CH_2-$, $(CH_3)CH_2-$, cyclohexyl, methylbenzyl, para-xylyl, acrylic, and carbonylbenzyl. If either one of R and R' is any of the above-described group, the other may be the above group or another group such as a linear or cyclic group. Specific examples of the monocarboxylic acid esters include monoesters of dimethylacetic acid, trimethylacetic acid, alpha-methylbutyric acid, beta-methylbutyric acid, methacrylic acid and benzoylacetic acid; and monocarboxylic acid esters formed with alcohols such as methanol, ethanol, isopropanol, isobutanol and tert-butanol.

Additional useful internal electron donors include internal electron donors containing at least one ether group and at least one ketone group. That is, the internal electron donor compound contains in its structure at least one ether group and at least one ketone group.

Examples of internal electron donors containing at least one ether group and at least one ketone group include compounds of the following Formula IV.

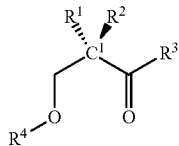

(IV)

wherein $R^1$, $R^2$, $R^3$, and $R^4$ are identical or different, and each represents a substituted or unsubstituted hydrocarbon group. In one embodiment, the substituted or unsubstituted hydrocarbon group includes from 1 to about 30 carbon atoms. In another embodiment, $R^1$, $R^2$, $R^3$, and $R^4$ are identical or different, and each represents a linear or branched alkyl group containing from 1 to about 18 carbon atoms, a cycloaliphatic group containing from about 3 to about 18 carbon atoms, an aryl group containing from about 6 to about 18 carbon atoms, an alkylaryl group containing from about 7 to about 18 carbon atoms, and an arylalkyl group containing from about 7 to about 18 carbon atoms. In yet another embodiment, $R^1$, $C^1$ and $R^2$ are a part of a substituted or unsubstituted cyclic or polycyclic structure containing from about 5 to about 14 carbon atoms. In still yet another embodiment, the cyclic or polycyclic structure has one or more substitutes selected from the group consisting of a linear or branched alkyl group containing from 1 to about 18 carbon atoms, a cycloaliphatic group containing from about 3 to about 18 carbon atoms, an aryl group containing from about 6 to about 18 carbon atoms, an alkylaryl group containing from about 7 to about 18 carbon atoms, and an arylalkyl group containing from about 7 to about 18 carbon atoms.

Specific examples of internal electron donors containing at least one ether group and at least one ketone group include 9-(alkylcarbonyl)-9'-alkoxymethylfluorene including 9-(methylcarbonyl)-9'-methoxymethylfluorene, 9-(methylcarbonyl)-9'-ethoxymethylfluorene, 9-(methylcarbonyl)-9'-propoxymethylfluorene, 9-(methylcarbonyl)-9'-butoxymethylfluorene, 9-(methylcarbonyl)-9'-pentoxymethylfluorene, 9-(ethylcarbonyl)-9'-methoxymethylfluorene, 9-(ethylcarbonyl)-9'-ethoxymethylfluorene, 9-(ethylcarbonyl)-9'-propoxymethylfluorene, 9-(ethylcarbonyl)-9'-butoxymethylfluorene, 9-(ethylcarbonyl)-9'-pentoxymethylfluorene, 9-(propylcarbonyl)-9'-methoxymethylfluorene, 9-(propylcarbonyl)-9'-ethoxymethylfluorene, 9-(propylcarbonyl)-9'-propoxymethylfluorene, 9-(propylcarbonyl)-9'-butoxymethylfluorene, 9-(propylcarbonyl)-9'-pentoxymethylfluorene, 9-(butylcarbonyl)-9'-methoxymethylfluorene, 9-(butylcarbonyl)-9'-ethoxymethylfluorene, 9-(butylcarbonyl)-9'-propoxymethylfluorene, 9-(butylcarbonyl)-9'-butoxymethylfluorene, 9-(pentylcarbonyl)-9'-methoxymethylfluorene, 9-(pentylcarbonyl)-9'-ethoxymethylfluorene, 9-(pentylcarbonyl)-9'-propoxymethylfluorene, 9-(pentylcarbonyl)-9'-butoxymethylfluorene, 9-(pentylcarbonyl)-9'-pentoxymethylfluorene, 9-(hexylcarbonyl)-9'-methoxymethylfluorene, 9-(hexylcarbonyl)-9'-ethoxymethylfluorene, 9-(hexylcarbonyl)-9'-propoxymethylfluorene, 9-(hexylcarbonyl)-9'-butoxymethylfluorene, 9-(hexylcarbonyl)-9'-pentoxymethylfluorene, 9-(octylcarbonyl)-9'-methoxymethylfluorene, 9-(octylcarbonyl)-9'-ethoxymethylfluorene, 9-(octylcarbonyl)-9'-propoxymethylfluorene, 9-(octylcarbonyl)-9'-butoxymethylfluorene, 9-(octylcarbonyl)-9'-pentoxymethylfluorene; 9-(i-octylcarbonyl)-9'-methoxymethylfluorene, 9-(i-octylcarbonyl)-9'-ethoxymethylfluorene, 9-(i-octylcarbonyl)-9'-propoxymethylfluorene, 9-(i-octylcarbonyl)-9'-butoxymethylfluorene, 9-(i-octylcarbonyl)-9'-pentoxymethylfluorene; 9-(i-nonylcarbonly)-9'-methoxymethylfluorene, 9-(i-nonylcarbonyl)-9'-ethoxymethylfluorene, 9-(i-nonylcarbonyl)-9'-propoxymethylfluorene, 9-(i-nonylcarbonyl)-9'-butoxymethylfluorene, 9-(i-nonylcarbonyl)-9'-pentoxymethylfluorene; 9-(2-ethyl-hexylcarbonyl)-9'-methoxymethylfluorene, 9-(2ethyl-hexylcarbonyl)-9'-ethoxymethylfluorene, 9-(2-ethyl-hexylcarbonyl)-9'-propoxymethylfluorene, 9-(2-ethyl-hexylcarbonyl)-9'-butoxymethylfluorene, 9-(2-ethyl-hexylcarbonyl)-9'-pentoxymethylfluorene, 9-(phenylketone)-9'-methoxymethylfluorene, 9-(phenylketone-9'-ethoxymethylfluorene, 9-(phenylketone)-9'-propoxymethylfluorene, 9-(phenylketone)-9'-butoxymethylfluorene, 9-(phenylketone)-9'- pentoxymethylfluorene, 9-(4-methylphenylketone)-9'-methoxymethylfluorene, 9-(3-methylphenylketone)-9'-methoxymethylfluorene, 9-(2-methylphenylketone)-9'-methoxymethylfluorene.

Additional examples include: 1-(ethylcarbonyl)-1'-methoxymethylcyclopentane, 1-(propylcarbonyl)-1'-methoxymethylcyclopentane, 1-(i-propylcarbonyl)-1'-methoxymethylcyclopentane, 1-(butylcarbonyl)-1'-methoxymethylcyclopentane, 1-(i-butylcarbonyl)-1'-methoxymethylcyclopentane. 1-(pentylcarbonyl)-1'-methoxymethylcyclopentane, 1-(i-pentylcarbonyl)-1'-methoxymethylcyclopentane, 1-(neopentylcarbonyl)-1'-methoxymethylcyclopentane, 1-(hexylcarbonyl)-1'-methoxymethylcyclopentane, 1-(2-ethylhexylcarbonyl)-1'-methoxymethylcyclopentane, 1-(octylcarbonyl)-1'-methoxymethylcyclopentane, 1-(i-octylcarbonyl)-1'-methoxymethylcyclopentane, 1-(i-nonylcarbonyl)-1'-methoxymethylcyclopentane. 1-(ethylcarbonyl)-1'-methoxymethyl-2-methylcyclopentane, 1-(propylcarbonyl)-1'-methoxymethyl-2-methylcyclopentane, 1-(i-propylcarbonyl)-1'-methoxymethyl-2methyl-cyclopentane, 1-(butylcarbonyl)-1'-methoxymethyl-2-methylcyclopentane, 1-(i-butylcarbonyl)-1'-methoxymethyl-2-methylcyclopentane. 1-(pentylcarbonyl)-1'-methoxymethyl-2-methylcyclopentane, 1-(i-pentylcarbonyl)-1'-methoxymethyl-2-methylcyclopentane, 1-(neopentylcarbonyl)-1'-methoxymethyl-2-methylcyclopentane, 1-(hexylcarbonyl)-1'-methoxymethyl-2-methylcyclopentane, 1-(2-ethylhexylcarbonyl)-1'-methoxymethyl-2-methyl cyclopentane, 1-(octylcarbonyl)-1'-methoxymethyl-2-methyl cyclopentane, 1-(i-octylcarbonyl)-1'-methoxymethyl-2-methyl cyclopentane, 1-(i-nonylcarbonyl)-1'-methoxymethyl-2-methyl cyclopentane, 1-(ethylcarbonyl)-1'-methoxymethyl-2,5-dimethylcyclopentane, 1-(propylcarbonyl)-1'-methoxymethyl-2,5-dimethylcyclopentane, 1-(i-propylcarbonyl)-1'-methoxymethyl-2,5-dimethyl-cyclopentane, 1-(butylcarbonyl)-1'-methoxymethyl-2,5-di-cyclopentane, 1-(i-butylcarbonyl)-1'-methoxymethyl-2,5-dimethylcyclopentane. 1-(pentylcarbonyl)-1'-methoxymethyl-2,5-dimethylcyclopentane, 1-(i-pentylcarbonyl)-1'-methoxymethyl-2,5-dimethylcyclopentane, 1-(neopentylcarbonyl)-1'-methoxymethyl-2,5-dimethylcyclopentane, 1-(hexylcarbonyl)-1'-methoxymethyl-2,5-dimethylcyclopentane, 1-(2-ethylhexylcarbonyl)-1'-methoxymethyl-2,5-dimethyl cyclopentane, 1-(octylcarbonyl)-1'-methoxymethyl-2,5-dimethyl cyclopentane, 1-(i-octylcarbonyl)-1'-methoxymethyl-2,5-dimethyl cyclopentane, 1-(i-nonylcarbonyl)-1'-methoxymethyl-2,5-dimethyl cyclopentane, 1-(ethylcarbonyl)-1'-methoxymethylcyclohexane, 1-(propylcarbonyl)-1'-methoxymethylcyclohexane, 1-(i-propylcarbonyl)-1'-methoxymethylcyclohexane, 1-(butylcarbonyl)-1'-methoxymethylcyclohexyl, 1-(i-butylcarbonyl)-1'-methoxymethylcyclohexane. 1-(pentylcarbonyl)-1'-methoxymethylcyclohexane, 1-(i-pentylcarbonyl)-1'-methoxymethylcyclohexane, 1-(neopentylcarbonyl)-1'-methoxymethylcyclohexane,1-(hexhylcarbonyl)-1'-methoxymethylcyclohexane, 1-(2-ethylhexylcarbonyl)-1'-methoxymethylcyclohexane, 1-(octylcarbonyl)-1'-methoxymethylcyclohexane, 1-(i-octylcarbonyl)-1'-methoxymethylcyclohexane, 1-(i-nonylcarbonyl)-1'-methoxymethylcyclohexane. 1-(ethylcarbonyl)-1'-methoxymethyl-2-methylcyclohexane, 1-(propylcarbonyl)-1'-methoxymethyl-2-methylcyclohexane, 1-(i-propanecarbonyl)-1'-methoxymethyl-2-methyl-cyclohexane, 1-(butylcarbonyl)-1'-methoxymethyl-2-methylcyclohexane, 1-(i-butylcarbonyl)-1'-methoxymethyl-2-methylcyclohexane. 1-(pentylcarbonyl)-1'-methoxymethyl-2-methylcyclohexane, 1-(i-pentylcarbonyl)-1'-methoxymethyl-2-methylcyclohexane, 1-(neopentylcarbonyl)-1'-methoxymethyl-2-methylcyclohexane,1-(hexhylcarbonyl)-1'-methoxymethyl-2-methylcyclohexane, 1-(2-ethylhexylcarbonyl)-1'-methoxymethyl-2-methyl cyclohexane, 1-(octylcarbonyl)-1'-methoxymethyl-2-methyl cyclohexane, 1-(i-octylcarbonyl)-1'-methoxymethyl-2-methyl cyclohexane, 1-(i-nonylcarbonyl)-1'-methoxymethyl-2-methyl cyclohexane, 1-(ethylcarbonyl)-1'-methoxymethyl-2,6-dimethylcyclohexane, 1-(propylcarbonyl)-1'-methoxymethyl-2,6-dimethylcyclohexane, 1-(i-propylcarbonyl)-1'-methoxymethyl-2,6-dimethyl-cyclohexane, 1-(butylcarbonyl)-1'-methoxymethyl-2,6-dimethyl-cyclohexane, 1-(i-butylcarbonyl)-1'-methoxymethyl-2,6-dimethylcyclohexane. 1-(pentylcarbonyl)-1'-methoxymethyl-2,6-dimethylcyclohexane, 1-(i-pentylcarbonyl)-1'-methoxymethyl-2,6-dimethylcyclohexane, 1-(neopentylcarbonyl)-1'-methoxymethyl-2,6-dimethylcyclohexane,1-(hexhylcarbonyl)-1'-methoxymethyl-2,6-dimethylcyclohexane, 1-(2-ethylhexylcarbonyl)-1'-methoxymethyl-2,6-dimethyl cyclohexane, 1-(octylcarbonyl)-1'-methoxymethyl-2,6-dimethyl cyclohexane, 1-(i-octylcarbonyl)-1'-methoxymethyl-2,6-dimethyl cyclohexane, 1-(i-nonylcarbonyl)-l-methoxymethyl-2,6-dimethyl cyclohexane, 2,5-dimethyl-3-ethylcarbonyl-3'-methoxymethylpentane, 2,5-dimethyl-3-propylcarbonyl-3'-methoxymethylpentane, 2,5-dimethyl-3-propylcarbonyl-3'-methoxymethylpentane, 2,5-dimethyl-3-butylcarbonyl-3'-methoxymethylpentane, 2,5-dimethyl-3-i-butylcarbonyl-1'-methoxymethylcyclohexyl. 2,5-dimethyl-3-pentylcarbonyl-3'-methoxymethylpentane, 2,5-dimethyl-3-i-pentylcarbonyl-3'-methoxymethylpentane, 2,5-dimethyl-3-neopentylcarbonyl-3'-methoxymethylpentane, 2,5-dimethyl-3-hexhylcarbonyl-3'-methoxymethylpentane, 2,5-dimethyl-3-2-ethylhexylcarbonyl-3'-methoxymethylpentane, 2,5-dimethyl-3-octylcarbonyl-3'-methoxymethylpentane, 2,5-dimethyl-3-i-octylcarbonyl-3'-methoxymethylpentane, and 2,5-dimethyl-3-i-nonylcarbonyl-3'-methoxymethylpentane.

In one embodiment, an internal electron donor is one or more selected from dialkyl-4-alkylphthalates including diisobutyl-4-methylphthalate and di-n-butyl-4-ethylphthalate; diisobutyl cyclopentane-1,1-dicarboxylate; and isobutyl 1-(methoxymethyl)cyclopentanecarboxylate.

Additional useful internal electron donors include 1,8-naphthyl diaryloate compounds that have three aryl groups connected by ester linkages (three aryl groups connected by two ester linkages, such as an aryl-ester linkage-naphthyl-ester linkage-aryl compound). 1,8-naphthyl diarylate compounds can be formed by reacting a naphthyl dialcohol compound with an aryl acid halide compound. Methods of forming an ester product through reaction of an alcohol and acid anhydride are well known in the art.

While not wishing to be bound by any theory, it is believed that the 1,8-naphthyl diaryloate compounds have a chemical structure that permits binding to both a titanium compound and a magnesium compound, both of which are typically present in a solid titanium catalyst component of an olefin polymerization catalyst system. The 1,8-naphthyl diaryloate compounds also act as internal electron donors, owing to the electron donation properties of the compounds, in a solid titanium catalyst component of an olefin polymerization catalyst system.

In one embodiment, the 1,8-naphthyl diaryloate compounds are represented by chemical Formula V:

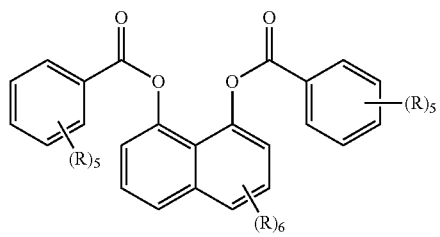

wherein each R is independently hydrogen, halogen, alkyl having 1 to about 8 carbon atoms, phenyl, arylalkyl having 7 to about 18 carbon atoms, or alkylaryl having 7 to about 18 carbon atoms. In another embodiment, each R is independently hydrogen, alkyl having 1 to about 6 carbon atoms, phenyl, arylalkyl having 7 to about 12 carbon atoms, or alkylaryl having 7 to about 12 carbon atoms.

General examples of 1,8-naphthyl diaryloate compounds include 1,8-naphthyl di(alkylbenzoates); 1,8-naphthyl di(dialkylbenzoates); 1,8-naphthyl di(trialkylbenzoates); 1,8-naphthyl di(arylbenzoates); 1,8-naphthyl di(halobenzoates); 1,8-naphthyl di(dihalobenzoates); 1,8-naphthyl di(alkylhalobenzoates);and the like.

Specific examples of 1,8-naphthyl diaryloate compounds include 1,8-naphthyl dibenzoate; 1,8-naphthyl di-4-methylbenzoate; 1,8-naphthyl di-3-methylbenzoate; 1,8-naphthyl di-2-methylbenzoate; 1,8-naphthyl di-4-ethylbenzoate; 1,8-naphthyl di-4-n-propylbenzoate; 1,8-naphthyl di-4-isopropylbenzoate; 1,8-naphthyl di-4-n-butylbenzoate; 1,8-naphthyl di-4-isobutylbenzoate; 1,8-naphthyl di-4-t-butylbenzoate; 1,8-naphthyl di-4-phenylbenzoate; 1,8-naphthyl di-4-fluorobenzoate; 1,8-naphthyl di-3-fluorobenzoate; 1,8-naphthyl di-2-fluorobenzoate; 1,8-naphthyl di-4-chlorobenzoate; 1,8-naphthyl di-3-chlorobenzoate; 1,8-naphthyl di-2-chlorobenzoate; 1,8-naphthyl di-4-bromobenzoate; 1,8-naphthyl di-3-bromobenzoate; 1,8-naphthyl di-2-bromobenzoate; 1,8-naphthyl di-4-cyclohexylbenzoate; 1,8-naphthyl di-2,3-dimethylbenzoate; 1,8-naphthyl di-2,4-dimethylbenzoate; 1,8-naphthyl di-2,5-dimethylbenzoate; 1,8-naphthyl di-2,6-dimethylbenzoate; 1,8-naphthyl di-3,4-dimethylbenzoate; 1,8-naphthyl di-3,5-dimethylbenzoate; 1,8-naphthyl di-2,3-dichlorobenzoate; 1,8-naphthyl di-2,4-dichlorobenzoate; 1,8-naphthyl di-2,5-dichlorobenzoate; 1,8-naphthyl di-2,6-dichlorobenzoate; 1,8-naphthyl di-3,4-dichlorobenzoate; 1,8-naphthyl di-3,5-dichlorobenzoate; 1,8-naphthyl di-3,5-di-t-butylbenzoate; and the like.

The internal electron donors can be used individually or in combination. In employing the internal electron donor, they do not have to be used directly as starting materials, but compounds convertible to the electron donors in the course of preparing the titanium catalyst components may also be used as the starting materials.

The solid titanium catalyst component may be formed by contacting the magnesium containing catalyst support, the titanium compound, and the optional internal electron donor by known methods used to prepare a highly active titanium catalyst component from a magnesium support, a titanium compound, and an optional electron donor.

Several examples of the method of producing the solid titanium catalyst component are briefly described below.

(1) The magnesium-based catalytic support, optionally with the internal electron donor, is reacted with the titanium compound in the liquid phase.

(2) The magnesium-based catalytic support and the titanium compounds are reacted in the presence of the internal electron donor to precipitate a solid titanium complex.

(3) The reaction product obtained in (2) is further reacted with the titanium compound.

(4) The reaction product obtained in (1) or (2) is further reacted with the internal electron donor and the titanium compound.

(5) The product obtained in (1) to (4) is treated with a halogen, a halogen compound or an aromatic hydrocarbon.

(6) A magnesium-based catalytic support is reacted with the optional internal electron donor, the titanium compound and/or a halogen-containing hydrocarbon.

(7) The magnesium-based catalytic support is reacted with the titanium compound in the liquid phase, filtered and washed. The reaction product is further reacted with the internal electron donor and the titanium compound, then activated with additional titanium compound in an organic medium.

When the solid titanium catalyst support is obtained by further reacting the magnesium-based support with a titanium compound, the solid precipitate is washed with an inert diluent and then treated with a titanium compound or a mixture of a titanium compound and an inert diluent. The amount of titanium compound used is from about 1 to about 20 moles, such as from about 2 to about 15 moles, per mole of magnesium halide in the magnesium-based support. The treatment temperature ranges from about 50° C. to about 150° C., such as from about 60° C. to about 100° C. If a mixture of a titanium compound and inert diluent is used to treat the magnesium-based support, the volume % of titanium compound in the treating solution is from about 10% to about 100%, the rest being an inert diluent.

The treated solids can be further washed with an inert diluent to remove ineffective titanium compounds and other impurities. The inert diluent herein used can be hexane, heptane, octane, 1,2-dichloroethane, benzene, toluene, xylenes, and other hydrocarbons.

In one embodiment, particularly embodiments following example (2) described above, the solid titanium catalyst component has the following chemical composition: titanium, from about 1.5 to about 6.0 wt %; magnesium, from about 10 to about 20 wt %; halogen, from about 40 to about 70 wt %; internal electron donor, from about 1 to about 25 wt %; and optionally inert diluent from about 0 to about 15 wt %.

The amounts of the ingredients used in preparing the solid titanium catalyst component can vary depending upon the method of preparation. In one embodiment, from about 0.01 to about 5 moles of the internal electron donor and from about 0.01 to about 500 moles of the titanium compound are used per mole of the magnesium compound used to make the solid titanium catalyst component. In another embodiment, from about 0.05 to about 2 moles of the internal electron donor and from about 0.05 to about 300 moles of the titanium compound are used per mole of the magnesium compound used to make the solid titanium catalyst component.

In one embodiment, in the solid titanium catalyst component, the atomic ratio of halogen/titanium is from about 4 to about 200; the internal electron donor/titanium mole ratio is from about 0.01 to about 10; and the magnesium/titanium atomic ratio is from about 1 to about 100. In another embodiment, in the solid titanium catalyst component, the atomic ratio of halogen/titanium is from about 5 to about 100; the internal electron donor/titanium mole ratio is from about 0.2 to about 6; and the magnesium/titanium atomic ratio is from about 2 to about 50.

The resulting solid titanium catalyst component generally contains a magnesium halide of a smaller crystal size than commercial magnesium halides and usually has a specific surface area of at least about 50 m$^2$/g, such as from about 60 to 1,000 m$^2$/g, or from about 100 to 800 m$^2$/g. Since, the above ingredients are unified to form an integral structure of the solid titanium catalyst component, the composition of the solid titanium catalyst component does not substantially change by washing with, for example, hexane.

The solid titanium catalyst component may be used after being diluted with an inorganic or organic compound such as a silicon compound, an aluminum compound.

The amounts of the ingredients used in preparing the solid titanium catalyst component may vary depending upon the method of preparation. In one embodiment, from about 0.01 to about 5 moles of the optional internal electron donor and from about 0.01 to about 500 moles of the titanium compound are used per mole of the magnesium compound used to make the solid titanium catalyst component. In another embodiment, from about 0.05 to about 2 moles of the internal electron donor and from about 0.05 to about 300 moles of the titanium compound are used per mole of the magnesium compound used to make the solid titanium catalyst component.

In one embodiment, the size (diameter) of the catalyst support particles is from about 5 μm to about 150 μm (on a 50% by volume basis). In another embodiment, the size (diameter) of the catalyst support particles is from about 15 μm to about 80 μm (on a 50% by volume basis). In yet another embodiment, the size (diameter) of catalyst support particles is from about 15 μm to about 45 μm (on a 50% by volume basis).

The catalyst support particles and resulting titanium solid component particles have a narrow size distribution. In one embodiment, 75% of the particles are within 25 μm of diameter (on a 50% by volume basis). In another embodiment, 75% of the particles are within 15 μm of diameter (on a 50% by volume basis). In yet another embodiment, 75% of the particles are within 10 μm of diameter (on a 50% by volume basis).

The resulting solid titanium catalyst component generally contains a magnesium halide of a smaller crystal size than commercial magnesium halides and usually has a specific surface area of at least about 50 m$^2$/g, such as from about 60 to 1,000 m$^2$/g, or from about 100 to 800 m$^2$/g. Since, the above ingredients are unified to form an integral structure of the solid titanium catalyst component, the composition of the solid titanium catalyst component does not substantially change by washing with solvents, for example, hexane.

The solid titanium catalyst component can be used after being diluted with an inorganic or organic compound such as a silicon compound or an aluminum compound. The disclosed catalyst systems further relate to an olefin polymerization catalyst system containing an antistatic agent, and optionally an organoaluminum compound and/or an organosilicon compound.

The catalyst system may contain at least one organoaluminum compound in addition to the solid titanium catalyst component. Compounds having at least one aluminum-carbon bond in the molecule can be used as the organoaluminum compound. Examples of organoaluminum compounds include compounds of the following Formulae VI and VII:

$$R_m^{11}Al(OR^{12})_nH_pX_q^1 \qquad (VI)$$

In Formula VI, $R^{11}$ and $R^{12}$ may be identical or different, and each represent a hydrocarbon group usually having 1 to about 15 carbon atoms, preferably 1 to about 4 carbon atoms; $X^1$ represents a halogen atom, $0<q\leq3$, $0\leq p\leq3$, $0\leq n\leq3$, and $m+n+p+q=3$.

Organoaluminum compounds further include complex alkylated compounds between aluminum and a metal of Group I represented by Formula VII:

$$M_r^1AlR_{3-r}^{11} \qquad (VII)$$

wherein $M^1$ represents Li, Na or K, and $R^{11}$ is as defined above.

Examples of the organoaluminum compounds are as follows:

compounds of the general formula $R_r^{11}Al(OR^{12})_{3-r}$ wherein $R^{11}$ is as defined above, and m is preferably a number represented by $1.5\leq r\leq3$;

compounds of the general formula $R_r^{11}AlX_{3-r}$ wherein $R^{11}$ is as defined above, $X^1$ is halogen, and m is preferably a number represented by $0<r<3$;

compounds of the general formula $R_r^{11}AlH_{3-r}$ wherein $R^{11}$ is as defined above, and m is preferably a number represented by $2\leq r<3$; and compounds represented by the general formula $R_s^{11}Al(OR^{12})_tX_u^1$ wherein $R^{11}$ and $R^{12}$ are as defined, $X^1$ is halogen, $0\leq s\leq3$, $0\leq t\leq3$, $0\leq u\leq3$, $s+t+u=3$.

Specific examples of the organoaluminum compounds represented by Formula VI include trialkyl aluminums such as triethyl aluminum and tributyl aluminum; trialkenyl aluminums such as triisoprenyl aluminum; dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; partially alkoxylated alkyl aluminums having an average composition represented by $R_{2.5}^{11}Al(OR^{12})_{0.5}$; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; partially halogenated alkyl aluminums, for example alkyl aluminum dihalides such as ethyl aluminum dichloride, propyl aluminum dichloride and butyl aluminum dibromide; dialkyl aluminum hydrides such as diethyl aluminum hydride and dibutyl aluminum hydride; other partially hydrogenated alkyl aluminum, for example alkyl aluminum dihyrides such as ethyl aluminum dihydride and propyl aluminum dihydride; and partially alkoxylated and halogenated alkyl aluminums such as ethyl aluminum ethoxychloride, butyl aluminum butoxychloride and ethyl aluminum ethoxybromide.

Organoaluminum compounds further include those similar to Formula VI such as in which two or more aluminum atoms are bonded via an oxygen or nitrogen atom. Examples are $(C_2H_5)_2AlOAl(C_2H_5)_2$, $(C_4H_9)_2AlOAl(C_4H_9)_2$,

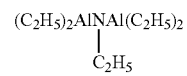

and methylaluminoxane.

Examples of organoaluminum compounds represented by Formula V include $LiAl(C_2H_5)_4$ and $LiAl(C_7H_{15})_4$.

The organoaluminum compound catalyst component is used in the described catalyst systems in an amount such that the mole ratio of aluminum to titanium (from the solid catalyst component) is from about 5 to about 1,000. In another embodiment, the mole ratio of aluminum to titanium in the catalyst system is from about 10 to about 700. In yet another embodiment, the mole ratio of aluminum to titanium in the catalyst system is from about 25 to about 400.

The organosilicon compound, when used as an external electron donor serving as one component of a Ziegler-Natta catalyst system for olefin polymerization, contributes to the ability to obtain a polymer (at least a portion of which is polyolefin) having a broad molecular weight distribution and controllable crystallinity while retaining high performance with respect to catalytic activity and the yield of highly isotactic polymer.

The Ziegler-Natta catalyst system can be used in polymerization of olefins in any suitable system/process. Examples of systems for polymerizing olefins are now described. Referring to FIG. 1, a high level schematic diagram of a system 10 for polymerizing olefins is shown. Inlet 12 is used to introduce catalyst system components into a reactor 14; catalyst system components can include olefins, optional comonomers, hydrogen gas, fluid media, pH adjusters, surfactants, and any other additives. Although only one inlet is shown, many are often employed. Reactor 14 is any suitable vehicle that can polymerize olefins. Examples of reactors 14 include a single reactor, a series of two or more reactors, slurry reactors, fixed bed reactors, gas phase reactors, fluidized gas reactors, loop reactors, multizone circulating reactors, and the like. Once polymerization is complete, or as polyolefins are produced, the polymer product is removed from the reactor 14 via outlet 16 which leads to a collector 18. Collector 18 can include downstream processing, such as heating, extrusion, molding, and the like.

Figure 2:
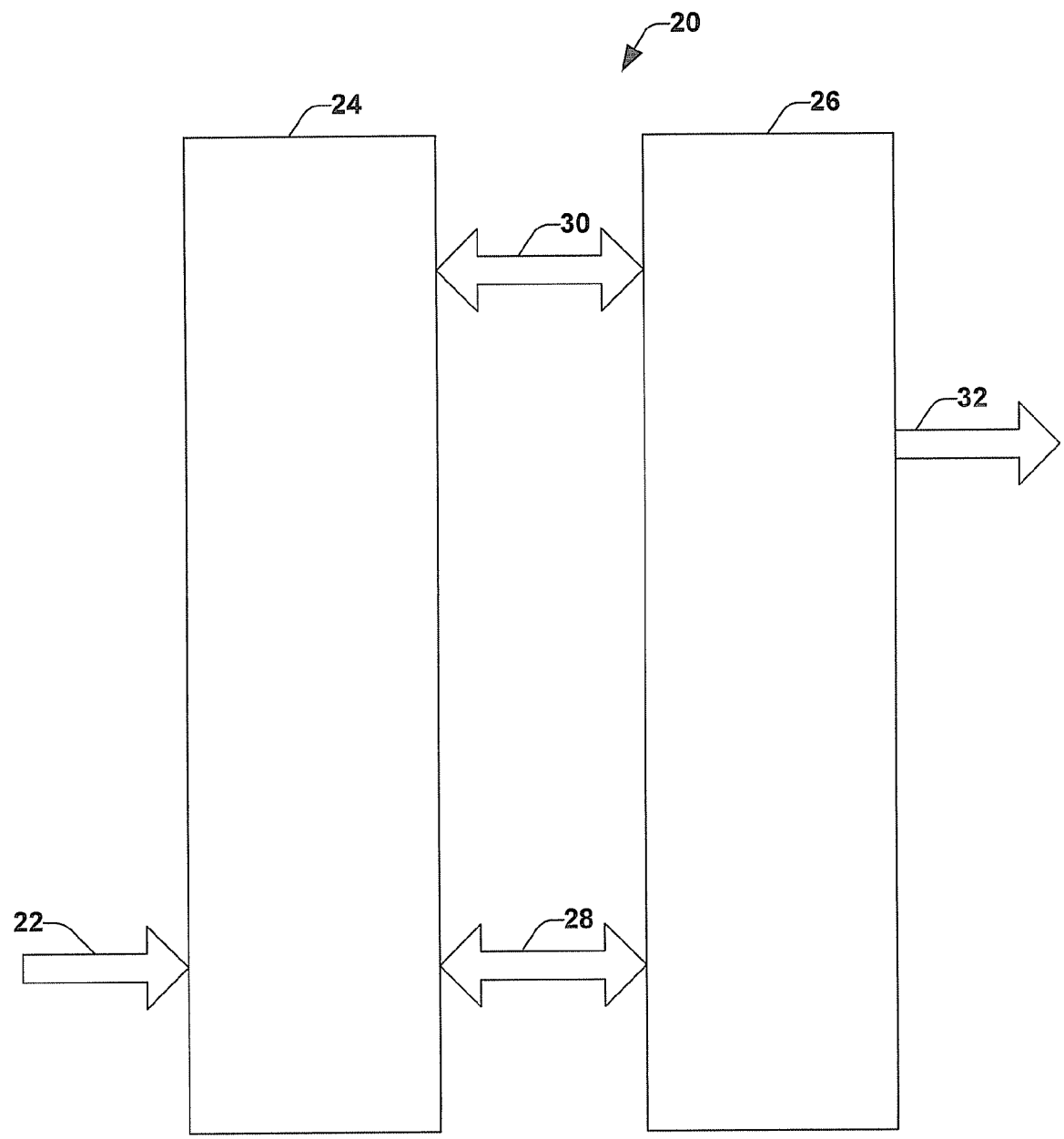
FIG. 2 is a schematic diagram of an olefin polymerization reactor in accordance with one aspect of the of the described polymerization systems.
Figure 3:
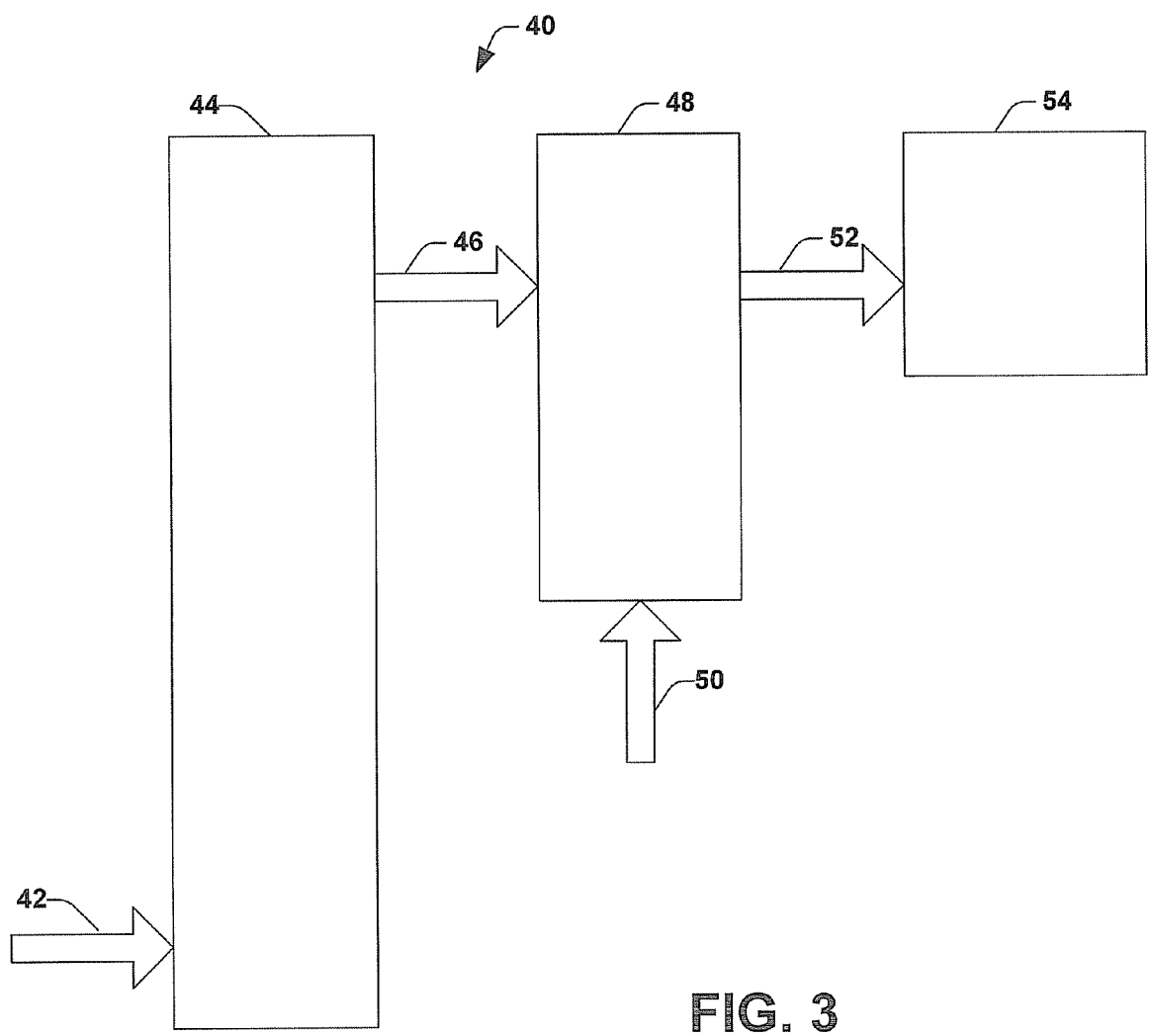
FIG. 3 is a high level schematic diagram of a system for making impact copolymer in accordance with one aspect of the described polymerization systems.

Referring to FIG. 2, a schematic diagram of a multizone circulating reactor 20 that can be employed as the reactor 14 in FIG. 1 or reactor 44 in FIG. 3 for making polyolefins is shown. The multizone circulating reactor 20 substitutes a series of separate reactors with a single reactor loop that permits different gas phase polymerization conditions in the two sides due to use of a liquid barrier. In the multizone circulating reactor 20, a first zone starts out rich in olefin monomer, and optionally one or more comonomers. A second zone is rich in hydrogen gas, and a high velocity gas flow divides the growing resin particles out loosely. The two zones produce resins of different molecular weight and/or monomer composition. Polymer granules grow as they circulate around the loop, building up alternating layers of each polymer fraction in an onion like fashion. In this manner, the polymer particles/granules take on the shape of the solid components of the catalyst system. Each polymer particle constitutes an intimate combination of both polymer fractions.

In operation, the polymer particles pass up through the fluidizing gas in an ascending side 24 of the loop and come down through the liquid monomer on a descending side 26. The same or different monomers (and again optionally one or more comonomers) can be added in the two reactor legs. The reactor uses the catalyst systems described above.

In the liquid/gas separation zone 30, hydrogen gas is removed to cool and recirculate. Polymer granules are then packed into the top of the descending side 26, where they then descend. Monomers are introduced as liquids in this section. Conditions in the top of the descending side 26 can be varied with different combinations and/or proportions of monomers in successive passes.

Referring to FIG. 3, a high level schematic diagram of another system 40 for polymerizing olefins is shown. This system is ideally suited to make impact copolymer. A reactor 44, such as a single reactor, a series of reactors, or the multizone circulating reactor is paired with a gas phase or fluidized bed reactor 48 downstream containing the catalyst systems described above to make impact copolymers with desirable impact to stiffness balance or greater softness than are made with conventional catalyst systems. Inlet 42 is used to introduce into the reactor 44 catalyst system components, olefins, optional comonomers, hydrogen gas, fluid media, pH adjusters, surfactants, and any other additives. Although only one inlet is shown, many often are employed. Through transfer means 46 the polyolefin made in the first reactor 44 is sent to a second reactor 48. Feed 50 is used to introduce catalyst system components, olefins, optional comonomers, fluid media, and any other additives. The second reactor 48 may or may not contain catalyst system components. Again, although only one inlet is shown, many often are employed. Once the second polymerization is complete, or as impact copolymers are produced, the polymer product is removed from the second reactor 48 via outlet 52 which leads to a collector 54. Collector 54 may include downstream processing, such as heating, extrusion, molding, and the like. At least one of the first reactor 44 and the second reactor 48 contains catalyst systems in accordance with the present disclosure.

When making an impact copolymer, polypropylene can be formed in the first reactor while an ethylene propylene rubber can be formed in the second reactor. In this polymerization, the ethylene propylene rubber in the second reactor is formed with the matrix (and particularly within the pores) of the polypropylene formed in the first reactor. Consequently, an intimate mixture of an impact copolymer is formed, wherein the polymer product appears as a single polymer product. Such an intimate mixture cannot be made by simply mixing a polypropylene product with an ethylene propylene rubber product.

Although not shown in any of the figures, the systems and reactors can be controlled, optionally with feedback based on continuous or intermittent testing, using a processor equipped with an optional memory and controllers. For example, a processor can be connected to one or more of the reactors, inlets, outlets, testing/measuring systems coupled with the reactors, and the like to monitor and/or control the polymerization process based on preset data concerning the reactions, and/or based on testing/measuring data generated during a reaction. The controller may control valves, flow rates, the amounts of materials entering the systems, the conditions (temperature, reaction time, pH, etc.) of the reactions, and the like, as instructed by the processor. The processor may contain or be coupled to a memory that contains data concerning various aspects of the polymerization process and/or the systems involved in the polymerization process.

The systems further relate to a polymerization process which involves polymerizing or copolymerizing olefins in the presence of the polymerization catalyst system described above. The catalyst system can produce polymer product having a controlled and/or relatively large size and shape. In one embodiment, using the catalyst support, catalyst system, and/or methods described herein, the polymer product has substantially an average diameter of about 300 μm or more (on a 50% by volume basis). In another embodiment, the polymer product has an average diameter of about 1,000 μm or more (on a 50% by volume basis). In yet another embodiment, the polymer product has an average diameter of about 1,500 μm or more (on a 50% by volume basis). The relatively large size of the polymer product permits the polymer product to contain a high amount of rubber without deleteriously affecting flow properties.

Polymerization of olefins is carried out in the presence of the catalyst system described above. Generally speaking, olefins are contacted with the catalyst system described above under suitable conditions to form desired polymer products. In one embodiment, preliminary polymerization described below is carried out before the main polymerization. In another embodiment, polymerization is carried out without preliminary polymerization. In yet another embodiment, the formation of impact copolymer is carried out using at least two polymerization zones.

The concentration of the solid titanium catalyst component in the preliminary polymerization is usually from about 0.01 to about 200 mM, preferably from about 0.05 to about 100 mM, calculated as titanium atoms per liter of an inert hydrocarbon medium described below. In one embodiment, the preliminary polymerization is carried out by adding an olefin and the above catalyst system ingredients to an inert hydrocarbon medium and reacting the olefin under mild conditions.

Specific examples of the inert hydrocarbon medium include aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride and chlorobenzene; and mixtures thereof. In the described catalyst systems, a liquid olefin may be used in place of part or the whole of the inert hydrocarbon medium.

The olefin used in the preliminary polymerization can be the same as, or different from, an olefin to be used in the main polymerization.

The reaction temperature for the preliminary polymerization is sufficiently low for the resulting preliminary polymer to not substantially dissolve in the inert hydrocarbon medium. In one embodiment, the temperature is from about −20° C. to about 100° C. In another embodiment, the temperature is from about −10° C. to about 80° C. In yet another embodiment, the temperature is from about 0° C. to about 40° C.

Optionally, a molecular-weight controlling agent, such as hydrogen, may be used in the preliminary polymerization. The molecular weight controlling agent is used in such an amount that the polymer obtained by the preliminary polymerization has an intrinsic viscosity, measured in decalin at 135° C., of at least about 0.2 dl/g, and preferably from about 0.5 to 10 dl/g.

In one embodiment, the preliminary polymerization is desirably carried out so that from about 0.1 g to about 1,000 g of a polymer forms per gram of the titanium catalyst component of the catalyst system. In another embodiment, the preliminary polymerization is desirably carried out so that from about 0.3 g to about 500 g of a polymer forms per gram of the titanium catalyst component. If the amount of the polymer formed by the preliminary polymerization is too large, the efficiency of producing the olefin polymer in the main polymerization may sometimes decrease, and when the resulting olefin polymer is molded into a film or another article, fish eyes tend to occur in the molded article. The preliminary polymerization may be carried out batchwise or continuously.

After the preliminary polymerization conducted as above, or without performing any preliminary polymerization, the main polymerization of an olefin is carried out in the presence of the above-described olefin polymerization catalyst system formed from the solid titanium catalyst component containing the organoaluminum compound and the organosilicon compounds (external electron donors).

Examples of olefins that can be used in the main polymerization are alpha-olefins having 2 to 20 carbon atoms such as ethylene, propylene, 1-butene, 4-methyl-1-pentene, 1-pentene, 1-octene, 1-hexene, 3-methyl-1-pentene, 3-methyl-1-butene, 1-decene, 1-tetradecene, 1-eicosene, and vinylcyclohexane. In the described processes, these alpha-olefins may be used individually or in any combination.

In one embodiment, propylene or 1-butene is homopolymerized, or a mixed olefin containing propylene or 1-butene as a main component is copolymerized. When the mixed olefin is used, the proportion of propylene or 1-butene as the main component is usually at least about 50 mole %, preferably at least about 70 mole %.

By performing the preliminary polymerization, the catalyst system in the main polymerization can be adjusted in the degree of activity. This adjustment tends to result in a polymer powder having good morphology and a high bulk density. Furthermore, when the preliminary polymerization is carried out, the particle shape of the resulting polymer becomes more rounded or spherical. In the case of slurry polymerization, the slurry attains excellent characteristics while in the case of gas phase polymerization, the catalyst bed attains excellent characteristics. Furthermore, in these embodiments, a polymer having a high isotacticity index can be produced with a high catalytic efficiency by polymerizing an alpha-olefin having at least about 3 carbon atoms. Accordingly, when producing the propylene copolymer, the resulting copolymer powder or the copolymer becomes easy to handle.

In the homopolymerization or copolymerization of these olefins, a polyunsaturated compound such as a conjugated diene or a non-conjugated diene may be used as a comonomer. Examples of comonomers include styrene, butadiene, acrylonitrile, acrylamide, alpha-methyl styrene, chlorostyrene, vinyl toluene, divinyl benzene, diallylphthalate, alkyl methacrylates and alkyl acrylates. In one embodiment, the comonomers include thermoplastic and elastomeric monomers.

In the described processes, the main polymerization of an olefin is carried out usually in the gaseous or liquid phase.

In one embodiment, polymerization (main polymerization) employs a catalyst system containing the titanium catalyst component in an amount from about 0.001 to about 0.75 mmol calculated as Ti atom per liter of the volume of the polymerization zone, the organoaluminum compound in an amount from about 1 to about 2,000 moles per mole of titanium atoms in the titanium catalyst component, and the organosilicon compounds (external donors), if present, in an amount from about 0.001 to about 10 moles calculated as Si atoms in the organosilicon compounds per mol of the metal atoms in the organoaluminum compound. In another embodiment, polymerization employs a catalyst system containing the titanium catalyst component in an amount from about 0.005 to about 0.5 mmol calculated as Ti atom per liter of the volume of the polymerization zone, the organoaluminum compound in an amount from about 5 to about 500 moles per mole of titanium atoms in the titanium catalyst component, and the organosilicon compounds (external donors), if present, in an amount from about 0.01 to about 2 moles calculated as Si atoms in the organosilicon compounds per mol of the metal atoms in the organoaluminum compound. In yet another embodiment, polymerization employs a catalyst system containing the organosilicon compounds (external donors), if present, in an amount from about 0.05 to about 1 mole calculated as Si atoms in the organosilicon compound per mol of the metal atoms in the organoaluminum compound.

In one embodiment, the polymerization temperature is from about 20° C. to about 200° C. In another embodiment, the polymerization temperature is from about 50° C. to about 180° C. In one embodiment, the polymerization pressure is typically from about atmospheric pressure to about 100 kg/cm². In another embodiment, the polymerization pressure is typically from about 2 kg/cm² to about 50 kg/cm². The main polymerization may be carried out batchwise, semi-continuously or continuously. The polymerization may also be carried out in two or more stages under different reaction conditions.

The olefin polymer so obtained may be a homopolymer, a random copolymer, a block copolymer or an impact copolymer. The impact copolymer contains an intimate mixture of a polyolefin homopolymer and a polyolefin rubber. Examples of polyolefin rubbers include ethylene propylene rubbers (EPR) such as ethylene propylene monomer copolymer rubber (EPM) and ethylene propylene diene monomer terpolymer rubber (EPDM).

The olefin polymer obtained by using the catalyst system has a very small amount of an amorphous polymer component and therefore a small amount of a hydrocarbon-soluble component. Accordingly, a film molded from this resultant polymer has low surface tackiness.

The polyolefin obtained by the polymerization process is excellent in particle size distribution, particle diameter and bulk density, and the copolyolefin obtained has a narrow composition distribution. In an impact copolymer, excellent fluidity, low temperature resistance, and a desired balance between stiffness and elasticity can be obtained.

In one embodiment, propylene and an alpha-olefin having 2 or from about 4 to about 20 carbon atoms are copolymerized in the presence of the catalyst system described above. The catalyst system can be one subjected to the preliminary polymerization described above. In another embodiment, propylene and an ethylene rubber are formed in two reactors coupled in series to form an impact copolymer.

The alpha-olefin having 2 carbon atoms is ethylene, and examples of the alpha-olefins having about 4 to about 20 carbon atoms are 1-butene, 1-pentene, 4-methyl-1-pentene, 1-octene, 1-hexene, 3-methyl-1-pentene, 3-methyl-1-butene, 1-decene, vinylcyclohexane, 1-tetradecene, and the like.

In the main polymerization, propylene may be copolymerized with two or more such alpha-olefins. For example, it is possible to copolymerize propylene with ethylene and 1-butene. In one embodiment, propylene is copolymerized with ethylene, 1-butene, or ethylene and 1-butene.

Block copolymerization of propylene and another alpha-olefin can be carried out in two stages. The polymerization in a first stage can be the homopolymerization of propylene or the copolymerization of propylene with the other alpha-olefin. In one embodiment, the amount of the monomers polymerized in the first stage is from about 50 to about 95% by weight. In another embodiment, the amount of the monomers polymerized in the first stage is from about 60 to about 90% by weight. In the described processes, this first stage polymerization can, as required, be carried out in two or more stages under the same or different polymerization conditions.

In one embodiment, the polymerization in a second stage is desirably carried out such that the mole ratio of propylene to the other alpha-olefin(s) is from about 10/90 to about 90/10. In another embodiment, the polymerization in a second stage is desirably carried out such that the mole ratio of propylene to the other alpha-olefin(s) is from about 20/80 to about 80/20. In yet another embodiment, the polymerization in a second stage is desirably carried out such that the mole ratio of propylene to the other alpha-olefin(s) is from about 30/70 to about 70/30. Producing a crystalline polymer or copolymer of another alpha-olefin may be provided in the second polymerization stage.

The propylene copolymer so obtained may be a random copolymer or the above-described block copolymer. This propylene copolymer typically contains from about 7 to about 50 mole % of units derived from the alpha-olefin having 2 or from about 4 to about 20 carbon atoms. In one embodiment, a propylene random copolymer contains from about 7 to about 20 mole % of units derived from the alpha-olefin having 2 or from about 4 to about 20 carbon atoms. In another embodiment, the propylene block copolymer contains from about 10 to about 50 mole % of units derived from the alpha-olefin having 2 or 4-20 carbon atoms.

In another one embodiment, copolymers made with the catalyst system contain from about 50% to about 99% by weight poly-alpha-olefins and from about 1% to about 50% by weight comonomers (such as thermoplastic or elastomeric monomers). In another embodiment, copolymers made with the catalyst system contain from about 75% to about 98% by weight poly-alpha-olefins and from about 2% to about 25% by weight comonomers.

In one embodiment, polymer particles formed by the catalyst systems disclosed herein have a diameter from about 5 to about 150 μm. In another embodiment, polymer particles have a diameter from about 18 to about 45 μm. In yet another embodiment, the polymer particles have a diameter from about 20 to about 50 μm.

It should be understood that where there is no reference to the polyunsaturated compound that can be used, the method of polymerization, the amount of the catalyst system and the polymerization conditions, the same description as the above embodiments are applicable.

The catalysts/methods of this disclosure can in some instances lead to the production of poly-alpha-olefins including ICPs having xylene solubles (XS) from about 0.5% to about 10%. In another embodiment, poly-alpha-olefins having xylene solubles (XS) from about 1% to about 6% are produced. In yet another embodiment, poly-alpha-olefins having xylene solubles (XS) from about 2% to about 5% are produced. XS refers to the percent of solid polymer that dissolves into xylene. A low XS % value generally corresponds to a highly isotactic polymer (i.e., higher crystallinity), whereas a high XS % value generally corresponds to a low isotactic polymer.

In one embodiment, the catalyst efficiency (measured as kilogram of polymer produced per gram of catalyst per hour) of the catalyst system is at least about 10. In another embodiment, the catalyst efficiency of the catalyst system is at least about 30. In yet another embodiment, the catalyst efficiency of the catalyst system is at least about 50.

The described catalysts/methods can in some instances lead to the production of polyolefins including having melt flow rate (MFR) from about 5 to about 250 g (10 min)$^{-1}$. The MFR is measured according to ASTM standard D 1238.

The described catalysts/methods lead to the production having a relatively narrow molecular weight distribution. In one embodiment, the Mw/Mn of a polypropylene polymer made with the described catalyst system is from about 2 to about 6. In another embodiment, the Mw/Mn of a polypropylene polymer made with the described catalyst system is from about 3 to about 5.

The following examples illustrate the described catalyst systems. Unless otherwise indicated in the following examples and elsewhere in the specification and claims, all parts and percentages are by weight, all temperatures are in degrees Centigrade, and pressure is at or near atmospheric pressure.

The addition of phthalic anhydride and Viscoplex 1-157 play a role in the dense phase viscosity. The viscosity difference between the two phases is a factor the amount of agitator force needed to produce a given particle size.

As chemical reactions are progressing both viscosity and time are factors in determining resultant particle size.

EXAMPLE 1

Figure 4:
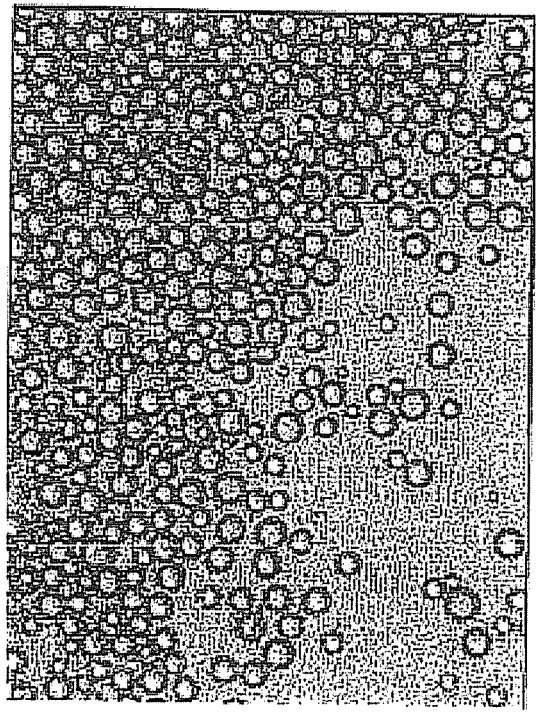
FIG. 4 is a micrograph of a magnesium-based support at 125× magnification in accordance with one aspect of described magnesium-based supports.

13.2 g (139 mmol) Magnesium chloride, 14.0 g epichlorohydrin and 33.6 g tributyl phosphate were dissolved in 120 g hexane at 60° C. for 5 hours with agitation. Then 3.8 grams phthalic anhydride (26 mmol) was added and the solution held for 1 additional hour at 60° C. The solution was cooled to 0° C. and then, 152 ml (1.38 mol) TiCl$_4$ was added over 1.5 hours while maintaining agitation and a temperature of 0° C. The mixture was raised to 25° C. while maintaining agitation. 5.4 g VISCOPLEX® (1-254) diluted in 40 grams hexane was added and the solution held for a period of one hour. The level of agitation can be adjusted to control the size of droplets. Then, the mixture was raised through 40° C. to solidify the heavy phase droplets and finally to 85° C. and 5 ml of di-isobutyl phthalate (DIBP) was added as an internal electron donor a held for one hour. The mother liquor was then filtered and washed with 200 ml of toluene for 10 minutes and repeated. At this point, the magnesium-based catalyst support was collected for particle sizing using a Malvern instrument and microscopic imaging. A digital image of a microscopic view (at 125× magnification) of the catalyst support of Example 1 is shown in FIG. 4.

The magnesium-based catalyst support of Example 1 was activated for use as a solid titanium catalyst component for use in a Ziegler-Natta catalyst system as follows. The magnesium-based support is contacted with 45 g TiCl$_4$ dissolved in 206.8 g toluene at 105° C. for 25 minutes and repeated three times to activate the Ziegler-Natta catalyst. The formed Ziegler-Natta catalyst is washed four times with 150 ml hexane at 60° C. for 25 to 30 minutes each repetition and subsequently dried under nitrogen.

EXAMPLE 2

Example Polymerization

Ziegler-Natta catalysts are sensitive to air and procedures must be observed to avoid exposure to oxygen. In general, organoaluminium compound and any optional external electron donors are added to the solid titanium catalyst component immediately prior to performance of the polymerization.

The catalyst charging procedure is designed such that the amount of mineral oil or other liquid comprising the catalyst slurry (i.e., hexane, mineral oil or other non-polar organic solvent) has minimal impact on the polymerization. The solid catalyst component was suspended with hexane in a glass vessel with a Teflon® stopcock, where the stopcock has an inlet to allow a continuous purge with nitrogen gas. The glass vessel serves as a catalyst charging device.

First, 1.5 ml of 25% triethyl aluminum (TEA) in hexane or similar non-polar solvent was injected into a 3.4 liter reactor at 35° C., which was free from air and moisture by a nitrogen purge. Second, 1.0 ml of a methylcyclohexyl dimethoxysilane (molar) hexane solution was injected into the 3.4 liter reactor. Similarly, 10 mg of the solid titanium catalyst component in mineral oil (1.0 mL) was added to the 3.4 liter. The reactor is also charge to 4 psi with hydrogen. The reactor is charged with 1500 ml liquid propylene 925° C.).

Figure 5:
FIG. 5 is a micrograph of polymer granule at 500× magnification in accordance with one aspect of the described polymerization methods.

The reactor temperature is increased to 70° C. of 5 minutes and then maintained at 70° C. for 1 hour. At the end of polymerization, the reactor is vented and cooled to 20° C. The polypropylene was completely dried in a vacuum oven. A micrograph of polymer granule at 500× magnification is shown in FIG. 5.

Table 1 reports the size of the titanium solid catalyst component used in Example 2 to form the catalyst system and the resulting polymer particle size. Table 2 reports the chemical composition of the titanium solid catalyst component used in Example 2 to form the catalyst system, catalytic activity of the catalyst system, and physical properties of the resulting polymer.

TABLE 1

Titanium Solid Component and Polymer Particle Size

|   | D50 (Ti component) μm | D50 (final) μm | D50 (polymer particle) μm |
|---|---|---|---|
| Example 2 | 34.4 | 27.5 | 1188 |

TABLE 2

Catalyst Composition and Catalytic Activity

|   | Ti (wt %) | Mg (wt %) | DIBP (wt %) | CE (kg PP/ g cat) | XS (wt %) | MFI (g/10 min) | BD (g/ml) |
|---|---|---|---|---|---|---|---|
| Example 2 | 1.17 | 17.88 | 16.96 | 38.1 | 1.47 | 5.2 | .463 |

In Tables 1 and 2, d50 represents the size of particles (diameter) wherein 50% of particles are less than that size, BD represents bulk density, and net catalytic activity (CE) reported in units of kg$_{polymer}$/(g$_{cat}$*hr) is calculated by dividing the amount of olefin polymer produced (kg) by the mass of the titanium solid catalyst component and scaling the resulting value to a time period of one hour. The amount of polymer produce is determined by subtracting the amount of polymer computed to be formed in then condensed phase prior to evaporation of olefin monomers from the total mass of polymer recovered. At any particular point in the polymerization reaction, the instantaneous reaction activity of olefin polymer production varies.

EXAMPLE 3-34

Factors Affecting Catalyst Particle Size

The following examples demonstrate the production of catalytic solids and the specific factors that can influence resultant particle size. Examples 3-34 were made using the following procedure, with specific values of variables A to E noted in FIG. 6.

A 1-liter Buchi reactor fitted with a 4 blade 45 pitch agitator with baffles was charged with 13.2 grams MgCl$_2$, 14.1 grams epichlorohydrin, 33.6 grams tributyl phosphate and 120 G hexane. The agitated mixture (400 rpm) was heated over 20 minutes to 60° C. and held for 5 hrs. The mixture was cooled to 0° C. until the next act was started. The sample was reheated to 60° C. and 4.2 grams phthalic anhydride added. Following 60 minutes, the solution was cooled to 0° C. TiCl$_4$ (262 grams) over Variable A while agitating at 700 rpm. The slurry temperature was raised to 5° C. and held for Variable B. The temperature was increased to Variable C before Viscoplex-154 (6 ml) diluted into 40 grams of hexane as added. Following the Viscoplex addition, the slurry was held for Variable D before continuing. The reactor temperature was increased to 85° C. over Variable E minutes. DiBP (3 ml) was added to the reaction mixture at 80° C. Once the reaction temperature reached 85° C., the mixture was held for 5 minutes following which the liquid was removed by filtration. The solid was washed twice with 260 ml of toluene.

FIG. 6 also reports particle size data for each specific example. Analysis of the experimental data reported in FIG. 6 showed that the particle size depended upon at least the following factors:

the $TiCl_4$ addition time duration;

the duration of the time after the Viscoplex material was added;

many other factors would contribute differently depending upon the dilatation of the $TiCl_4$ addition, and these other factors included:

the hold time after the $TiCl_4$ addition;

the temperature at which the Viscoplex material was added; and the rate that the temperature was increased after the Viscoplex delay was completed.

Thus, by controlling any one or more of the $TiCl_4$ addition time duration; the duration of the time after the Viscoplex material was added; the hold time after the $TiCl_4$ addition; the temperature at which the Viscoplex material was added; and the rate that the temperature was increased after the Viscoplex delay was completed, it is possible to increase or decrease the size of the resultant catalytic particle.

As used herein, the terms alkyl and alkoxy refer to a substituent group that has predominantly hydrocarbon character including unsaturated substituents having double or triple carbon-carbon bonds. The term "alkyl" refers to a substituent group having a carbon atom directly bonded to a main group; the term "alkoxy" refers to a substituent group having an oxygen atom directly bonded to a main group. These include groups that are not only purely hydrocarbon in nature (containing only carbon and hydrogen), but also groups containing substituents or hetero atoms which do not alter the predominantly hydrocarbon character of the group. Such substituents can include, but are not limited to, halo-, carbonyl-, ester-, hydroxyl-, amine-, ether-, alkoxy-, and nitro groups. These groups also may contain hetero atoms. Suitable hetero atoms will be apparent to those skilled in the art and include, for example, sulfur, nitrogen and particularly oxygen, fluorine, and chlorine. Therefore, while remaining mostly hydrocarbon in character, these groups may contain atoms other than carbon present in a chain or ring otherwise composed of carbon atoms. In general, no more than about three non-hydrocarbon substituents or hetero atoms, and preferably no more than one, will be present for every five carbon atoms in any compound, group or substituent described as "hydrocarbyl" within the context of this disclosure. The terms alkyl and alkoxy expressly encompass C1-C10 alkyl and alkoxy groups such as methyl, ethyl, propyl, butyl, pentyl, hexyl, cyclopropyl, cyclobutyl, cyclopentyl, cyclohexyl t-butyl, t-butoxy, ethoxy, propyloxy, t-amyl, s-butyl, isopropyl, octyl, nonyl, methoxy, ethoxy, propoxy, butoxy, pentoxy, hexoxy, cyclopropoxy, cyclobutoxy, cyclopentoxy, and cyclohexoxy as well as any of the preceding having hydrogen substituted with hydroxyl, amine, or halo groups or atoms. The term aryl expressly includes, but is not limited to, aromatic groups such as phenyl and furanyl, and aromatic groups substituted with alkyl, alkoxy, hydroxyl, amine, and/or halo groups or atoms, wherein any atom of the aryl substituent is bonded to a Si atom.

With respect to any figure or numerical range for a given characteristic, a figure or a parameter from one range may be combined with another figure or a parameter from a different range for the same characteristic to generate a numerical range.

Other than in the operating examples, or where otherwise indicated, all numbers, values and/or expressions referring to quantities of ingredients, reaction conditions, etc., used in the specification and claims are to be understood as modified in all instances by the term "about."

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A solid titanium catalyst component for the production of a polyolefin, comprising:

a titanium compound;

a magnesium-based support;

the solid titanium catalyst component having a substantially spherical shape and a median diameter from about 5 to about 150 μm (on a 50% by volume basis); and the solid titanium catalyst component made by a process comprising contacting a non-reducible magnesium compound, an alkylepoxide, a Lewis base, and an organic solvent to form an intermediate; wherein the organic solvent contains up to 25% toluene and at least one non-aromatic alkane-based solvent, wherein the intermediate forms at least two phases subsequent to the addition of a titanium halide: one phase comprising magnesium compounds and a second organic solvent phase, followed by forming an emulsion of the two phases;

then raising the emulsion to a greater temperature to solidify the magnesium phase to form the solid titanium catalyst component and separating the solidified solid titanium catalyst component having a substantially spherical shape.

2. The solid titanium catalyst component of claim 1, wherein a polymer surfactant is added when raising the temperature to a greater temperature to solidify the magnesium phase.

3. The solid titanium catalyst component of claim 1, wherein the solid titanium catalyst component further comprises an internal electron donor.

4. The solid titanium catalyst component of claim 1, wherein the alkylepoxide is epichlorohydrin and the Lewis base is tributyl phosphate acid ester.

5. The solid titanium catalyst component of claim 1, wherein the sphericalness, f, of the solid titanium catalyst component is greater than about 0.8.

6. The solid titanium catalyst component of claim 1, wherein the particle size span of the magnesium-based support is from about 0.25 to about 1.75 when the particle size span is determined by subtracting the D10 size from the D90 size, then dividing by the D50 size.

7. A method of making a solid titanium catalyst component for the production of a polyolefin, comprising:

contacting a non-reducible magnesium compound, an alkylepoxide, a Lewis base, and an organic solvent to form an intermediate; wherein the organic solvent contains up to 25% toluene and at least one non-aromatic alkane-based solvent wherein the intermediate forms at least two phases subsequent to the addition of a titanium halide: one phase comprising at least one magnesium compound and a second organic solvent phase followed by forming an emulsion of the two phases;

then raising the emulsion to a greater temperature to solidify the magnesium phase to form a solid titanium catalyst component and separating the solid titanium catalyst component having a substantially spherical shape.

8. The method of claim 7, further comprising controlling the size of the solid titanium catalyst component separated from the emulsion by adjusting the temperature of the addition of the titanium halide and adding a surfactant when raising the temperature to a greater temperature to solidify the magnesium phase.

9. The method of claim 7, further comprising:
agitating the emulsion at an energy; and
controlling the size of the solid titanium catalyst component separated from the emulsion by adjusting the energy of agitation.

10. The method of claim 7, wherein the sphericalness, f, of the solid titanium catalyst component is greater than about 0.8.

11. The method of claim 7, wherein the non-aromatic alkane based organic solvent is selected from the group consisting of pentane, hexane, heptane, octane, and cyclohexane.

12. The method of claim 7, wherein the Lewis base comprises a trialkyl phosphate acid ester.

13. The method of claim 7, wherein the Lewis base comprises a tributyl phosphate acid ester.

14. The method of claim 7, wherein the non-reducible magnesium compound is $MgCl_2$, the haloalkylepoxide is epichlorohydrin, the Lewis base is tributyl phosphate acid ester, and the non-aromatic alkane based organic solvent is hexane.

15. The method of claim 7, wherein the surfactant comprises a polymer surfactant.

16. The method of claim 7, wherein contact between the non-reducible magnesium compound and the haloalkylepoxide forms an intermediate species having a magnesium atom bonded to a haloalkoxide moiety.

17. The method of claim 7, wherein the temperature of the addition of the titanium halide is from about −10 to about 10° C. and the temperature of addition of surfactant is from about 15 to about 30° C.

18. The method of claim 7, further comprising heating the phase-separated mixture to a temperature to solidify the magnesium-based catalyst support, wherein the temperature of the addition of the titanium halide is from about −10 to about 10° C., the temperature of addition of surfactant is from about 15 to about 30° C., and the temperature to solidify the magnesium phase to form a solid titanium catalyst component is from about 35 to about 50° C.

19. The method of claim 7, wherein the particle size span of the solid titanium catalyst component is from about 0.25 to about 1.75 when the particle size span is determined by subtracting the D10 size from the D90 size, then dividing by the D50 size.

20. The method of claim 7, further comprising combining the solid titanium catalyst component with an internal electron donor.

21. The method of claim 20, wherein the internal electron donor comprises a phthalate ester.

22. The method of claim 20, wherein the internal electron donor comprises a Lewis base.

23. A catalyst system for the polymerization of an olefin, comprising:
a solid titanium catalyst component having a substantially spherical shape and a median diameter from about 5 to about 150 μm (on a 50% by volume basis), the solid titanium catalyst component comprising a titanium halide compound and a magnesium-based support, the solid titanium catalyst component made by process comprising contacting a non-reducible magnesium compound, an alkylepoxide, a Lewis base, and an organic solvent to form an intermediate, wherein the organic solvent contains up to 25% toluene and at least one non-aromatic alkane-based solvent wherein the intermediate forms at least two phases subsequent to the addition of a titanium halide: one phase comprising magnesium compounds and a second organic solvent phase, followed by forming an emulsion of the two phases, then raising the emulsion to a greater temperature to solidify the magnesium phase to form the solid titanium catalyst component and separating the solid titanium catalyst component having a substantially spherical shape; and an organoaluminum compound having at least one aluminum-carbon bond, and an external electron donor.

* * * * *